United States Patent
Zhou et al.

(10) Patent No.: US 10,630,495 B2
(45) Date of Patent: Apr. 21, 2020

(54) POLICY CONTROL METHOD, APPARATUS AND SYSTEM

(71) Applicant: ZTE CORPORATION, Shenzhen, Guangdong (CN)

(72) Inventors: Xiaoyun Zhou, Shenzhen (CN); Shuang Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/318,274

(22) PCT Filed: Jul. 6, 2017

(86) PCT No.: PCT/CN2017/092081
§ 371 (c)(1),
(2) Date: Apr. 17, 2019

(87) PCT Pub. No.: WO2018/014740
PCT Pub. Date: Jan. 25, 2018

(65) Prior Publication Data
US 2019/0238350 A1      Aug. 1, 2019

(30) Foreign Application Priority Data

Jul. 18, 2016 (CN) .......................... 2016 1 0566487
Oct. 10, 2016 (CN) .......................... 2016 1 0884609

(51) Int. Cl.
*H04L 12/14* (2006.01)
*H04W 28/24* (2009.01)
*H04W 4/24* (2018.01)

(52) U.S. Cl.
CPC ........... *H04L 12/1407* (2013.01); *H04W 4/24* (2013.01); *H04W 28/24* (2013.01)

(58) Field of Classification Search
CPC ..... H04L 12/1407; H04L 12/14; H04L 47/20; H04L 65/1069; H04L 47/2483;
(Continued)

(56) References Cited

U.S. PATENT DOCUMENTS

2006/0002422 A1* 1/2006 Hurtta ................. H04L 29/06
                                                             370/465
2017/0163819 A1* 6/2017 Zhou ........................ H04W 4/24
2019/0191336 A1* 6/2019 Rivas Molina ......... H04L 47/20

FOREIGN PATENT DOCUMENTS

CN      101720112 A      6/2010
CN      102131296 A      7/2011
(Continued)

OTHER PUBLICATIONS

International Search Report and Written Opinion for International Appl. No. PCT/CN2017/092081, dated Sep. 28, 2017.

*Primary Examiner* — Daniel Lai
(74) *Attorney, Agent, or Firm* — Christopher J. McKenna; Paul M. H. Pua

(57) ABSTRACT

The present disclosure provides a policy control method, apparatus and system. The method includes: receiving a first message indicating a resource allocation result and determining, according to a first instance identifier in the first message, a corresponding second instance identifier, where the first instance identifier corresponds to a policy rule instance for executing resource allocation and the second instance identifier corresponds to a media component instance or a media sub-component instance for making the policy rule instance; and sending a second message indicating the resource allocation result to an application function (AF) entity, where the second message carries the second instance identifier.

18 Claims, 7 Drawing Sheets

(58) Field of Classification Search
CPC . H04L 67/14; H04L 12/1403; H04L 65/1063; H04L 43/0817; H04L 61/2557; H04L 67/2871; H04L 12/189; H04L 41/5006; H04L 41/5019; H04M 15/66; H04M 15/8214; H04M 7/0012; H04W 4/24; H04W 28/0268; H04W 28/24; H04W 28/02; H04W 28/16; H04W 24/04; H04W 72/10; H04W 76/11; H04W 24/02; H04W 4/00; H04W 28/10; H04W 28/26; H04W 72/1257; H04W 76/15; H04W 12/00512; H04W 12/0052; H04W 16/02; H04W 28/18; H04W 28/22; H04W 36/0011; H04W 76/00; H04W 88/14
See application file for complete search history.

(56) References Cited

FOREIGN PATENT DOCUMENTS

| | | | |
|---|---|---|---|
| CN | 102136983 | A | 7/2011 |
| CN | 102404319 | A | 4/2012 |
| CN | 104620536 | A | 5/2015 |
| WO | WO-2015169264 | A1 * | 11/2015 |

* cited by examiner

POLICY CONTROL METHOD, APPARATUS AND SYSTEM

CROSS-REFERENCE TO RELATED APPLICATIONS

This is a U.S. National Stage Application, under 35 U.S.C. 371, of International Patent Application No. PCT/CN2017/092081, filed on Jul. 6, 2017, which claims priority to Chinese Patent Application No. 201610566487.9, filed on Jul. 18, 2016, and to Chinese Patent Application No. 201610884609.9, filed on Oct. 10, 2016, the contents of which are incorporated herein by reference in their entireties.

TECHNICAL FIELD

The present disclosure relates to, but is not limited to, the field of communications and, in particular, relates to a policy control method, apparatus and system.

BACKGROUND

FIG. 1 is a schematic diagram of policy and charging control (PCC) architecture defined in the 3rd Generation Partnership Project (3GPP). As shown in FIG. 1, a policy and charging rules function (PCRF) enacts a Quality of Service (QoS) and charging policy for network resources used by traffic. To enact the above control policy, the PCRF needs to consider traffic information received from an application function (AF), user subscription information received from a subscription profile repository (SPR) and a policy configured by an operator, and the like. The PCRF sends the control policy made for the traffic to a policy and charging enforcement function (PCEF) or a bearer binding and event report function (BBERF) for implementation. Meanwhile, the PCRF may subscribe to events related to a bearer layer from the PCEF and/or the BBERF so that the PCRF can timely perceive the events and change the control policy when the events happen on the bearer layer. In addition, the PCEF and a traffic detection function (TDF) can perform an application detection and control function according to a PCC rule (PCEF) or an application detection and control (ADC) rule sent by the PCRF, which further includes an online charging system (OCS), an offline charging system (OFCS), and communication interfaces between modules such as Rx, Nt, Sp, Gxx and the like.

The AF allocate resources of a network layer to the application by providing the traffic information to the PCRF and requesting the QoS authorization of the network. FIG. 2 is a flowchart in which an AF requests a network QoS guarantee. The process includes the steps described below.

In step 201, the AF provides the traffic information to the PCRF. The traffic information is carried in a message, which includes a media description component (carried in a Media-Component-Description AVP).

An authentication and authorization request (AAR) message sent by the AF to the PCRF for providing the traffic information has a format below. One AAR message may include zero media description component, one media description component, or multiple media description components.

<AA-Request>::=<Diameter Header: 265, REQ, PXY>
<Session-Id>
{Auth-Application-Id}
{Origin-Host}
{Origin-Realm}
{Destination-Realm}
[Destination-Host]
[IP-Domain-Id]
[Auth-Session-State]
[AF-Application-Identifier]
[Media-Component-Description]
[Service-Info-Status]
[AF-Charging-Identifier]
[SIP-Forking-Indication]
[Specific-Action]
[Subscription-Id]
[Supported-Features]
[Reservation-Priority]
[Framed-IP-Address]
[Framed-Ipv6-Prefix]
[Called-Station-Id]
[Service-URN]
[Reference-Id]
[Origin-State-Id]
*[Proxy-Info]
*[Route-Record]
*[AVP]

The Media-Component-Description AVP has a format below. One Media-Component-Description AVP includes zero Media-Sub-Component AVP, one Media-Sub-Component AVP, or multiple Media-Sub-Component AVPs. The Media-Component-Description is identified by a Media-Component-Number.

Media-Component-Description::=<AVP Header: 517>
{Media-Component-Number}; Ordinal number of the media comp.
*[Media-Sub-Component]; Set of flows for one flow identifier
[AF-Application-Identifier]
[Media-Type]
[Max-Requested-Bandwidth-UL]
[Max-Requested-Bandwidth-DL]
[Max-Supported-Bandwidth-UL]
[Max-Supported-Bandwidth-DL]
[Min-Desired-Bandwidth-UL]
[Min-Desired-Bandwidth-DL]
[Min-Requested-Bandwidth-UL]
[Min-Requested-Bandwidth-DL]
[Flow-Status]
[Priority-Sharing-Indicator]
[Reservation-Priority]
[RS-Bandwidth]
[RR-Bandwidth]
*[Codec-Data]
[Sharing-Key-DL]
[Sharing-Key-UL]
*[AVP]

The Media-Sub-Component AVP has a format below. A Flow-Number is used for identifying a Media-Sub-Component.

Media-Sub-Component::=<AVP Header: 519>
{Flow-Number}; Ordinal number of the IP flow
0*2[Flow-Description]; UL and/or DL
[Flow-Status]
[Flow-Usage]
[Max-Requested-Bandwidth-UL]
[Max-Requested-Bandwidth-DL]
[AF-Signalling-Protocol]
[ToS-Traffic-Class]
*[AVP]

In step 202, the PCRF stores the traffic information and returns an acknowledgement message.

In step 203, the PCRF makes a policy decision and makes a PCC rule according to a network policy, the traffic information and the user subscription information etc. In this process, the PCRF may need to interact with the SPR and acquire the user subscription information.

In step 204, the PCRF provides the PCC rule made after the policy decision to the PCEF.

In step 205, the PCEF returns an acknowledgement message after installing the PCC rule.

In step 206, the PCEF initiates a resource reservation process according to the PCC rule.

In step 207, after the PCRF provides the PCC rule to the PCEF (the step 204), the PCRF receives updated traffic information which carries updated media description component.

In step 208, the PCRF stores the updated traffic information and returns an acknowledgement message.

In step 209, the PCRF makes the policy decision and updates the previous PCC rule according to the network policy, the traffic information and the user subscription information etc.

In step 210, the PCRF provides the updated PCC rule to the PCEF.

In step 211, the PCEF returns an acknowledgement message after installing the PCC rule.

In step 212, the PCEF initiates the resource reservation process according to the installed PCC rule.

In step 213, the PCEF receives a response message of the resource reservation process initiated in step 206 which indicates a resource reservation failure.

In step 214, the PCEF sends an event notification to the PCRF, where the event notification carries a resource reservation failure indication and a corresponding PCC rule name.

In step 215, the PCRF returns an acknowledgement message to the PCEF.

In step 216, the PCRF sends the event notification to the AF, where the event notification carries the resource reservation failure indication and a flow identifier.

The PCEF sends the event notification to the PCRF through an RAR message. The RAR message has a format below. A Specific-Action AVP is used for carrying the resource reservation failure indication and a Flows AVP is used for carrying the flow identifier.

<RA-Request>::=<Diameter Header: 258, REQ, PXY>
<Session-Id>
[DRMP]
{Origin-Host}
{Origin-Realm}
{Destination-Realm}
{Destination-Host}
{Auth-Application-Id}
*{Specific-Action}
*[Access-Network-Charging-Identifier]
[Access-Network-Charging-Address]
[AN-Trusted]
*[Flows]
*[Subscription-Id]
[Abort-Cause]
[IP-CAN-Type]
[NetLoc-Access-Support]
[RAT-Type]
[Sponsored-Connectivity-Data]
[3GPP-User-Location-Info]
[User-Location-Info-Time]
[3GPP-MS-TimeZone]
*[RAN-NAS-Release-Cause]
[3GPP-SGSN-MCC-MNC]
[TWAN-Identifier]
[UE-Local-IP-Address]
[Origin-State-Id]
*[Class]
*[Proxy-Info]
*[Route-Record]
*[AVP]

The Flows AVP has a format below. Media-Component-Number is used for identifying an IP flow.

Flows::=<AVP Header: 510>
{Media-Component-Number}
*[Flow-Number]
[Final-Unit-Action]
*[AVP]

In step 217, the AF returns an acknowledgement message to the PCRF.

In the above process, the AF receives the resource reservation failure feedback after sending the updated traffic information to the PCRF, so the AF cannot determine whether the resource reservation corresponding to the initially provided traffic information fails or the resource reservation corresponding to the updated traffic information fails. Similarly, the PCRF receives the resource reservation failure feedback after providing the updated PCC rule to the PCEF, so the PCRF cannot determine whether the resource reservation corresponding to the initially provided PCC rule fails or the resource reservation corresponding to the updated PCC rule fails.

The above problem also exists in the case where the AF continuously updates the traffic information for multiple times after an initial resource reservation succeeds. When the resource reservation corresponding to one traffic information updating fails, the AF cannot know which traffic information updating corresponds to the failed resource reservation.

Accordingly, the AF cannot know a successful resource reservation corresponds to which traffic information updating.

SUMMARY

The following is a summary of the subject matter described herein in detail. This summary is not intended to limit the scope of the claims.

Embodiments of the present disclosure provide a policy control method, apparatus and system to enable an AF to accurately acquire a resource reservation result.

An embodiment of the present disclosure provides a policy control method. The method includes: receiving a first message indicating a resource allocation result, and determining, according to a first instance identifier in the first message, a corresponding second instance identifier, where the first instance identifier corresponds to a policy rule instance for executing resource allocation and the second instance identifier corresponds to a media component instance or a media sub-component instance for making the policy rule instance; and sending a second message indicating the resource allocation result to an application function (AF) entity, where the second message carries the second instance identifier.

In an implementation mode, the receiving a first message indicating a resource allocation result includes: receiving the first message indicating the resource allocation result from a policy and charging enforcement function (PCEF) entity; or receiving the first message indicating the resource allocation result from a bearer binding and event report function (BBERF) entity.

In an implementation mode, the first instance identifier carries indication information that a policy decision is triggered by traffic information or indication information that the second instance identifier corresponding to the first instance identifier exists.

In an implementation mode, the indication information is an identifier bit or a specific value range in values of the first instance identifier.

In an implementation mode, before the second instance identifier is determined according to the first instance identifier in the first message, the method further includes one of the steps described below.

The second instance identifier allocated by the AF entity is received.

The second instance identifier is allocated to the media component instance or the media sub-component instance.

In an implementation mode, the step of receiving the second instance identifier allocated by the AF entity includes: receiving the second instance identifier allocated by the AF entity to the media component instance. The method further includes: making one or more policy and charging control (PCC) rule instances according to the media component instance, where the first instance identifier corresponding to the second instance identifier is carried in the one or more PCC rule instances.

In an implementation mode, the step of making one or more PCC rule instances according to the media component instance includes: when one PCC rule instance is made according to the media component instance and the media component instance carries a plurality of media sub-components, aggregating the plurality of media sub-components and making the one PCC rule instance; or when a plurality of PCC rule instances are made according to the media component instance, carrying the first instance identifier in each of the plurality of PCC rule instances.

In an implementation mode, the step of allocating the second instance identifier to the media component instance or the media sub-component instance includes: when one PCC rule instance is made according to the media component instance, allocating the second instance identifier to the media component instance; or when one PCC rule instance is made according to one or more media sub-component instances, allocating the second instance identifier to the one or more media sub-component instances.

In an implementation mode, before the first message indicating the resource allocation result is received, the method further includes: allocating the first instance identifier to a PCC rule instance, where the first instance identifier is determined according to the second instance identifier.

In an implementation mode, a relationship between the second instance identifier and the first instance identifier satisfies one of the relationships described below.

A value of the second instance identifier is the same as a value of the first instance identifier;

The value of the second instance identifier is calculated using the value of the first instance identifier according to configuration.

The value of the second instance identifier is obtained according to a correspondence between the first instance identifier and the second instance identifier stored by a PCRF.

In an implementation mode, the first message further carries a rule identifier of the policy rule instance and the second message further carries an identifier of the media component instance or an identifier of the media sub-component instance, where the rule identifier is used for determining the media component instance or the media sub-component instance.

In an implementation mode, after the second instance identifier is allocated to the media component instance, the method further includes: returning the second instance identifier to the AF entity and providing an identifier of the media component instance or the media sub-component instance for the AF entity.

Another embodiment of the present disclosure provides a policy control apparatus. The apparatus includes a first receiving module and a sending module. The first receiving module is configured to receive a first message indicating a resource allocation result and determine, according to a first instance identifier in the first message, a corresponding second instance identifier, where the first instance identifier corresponds to a policy rule instance for executing resource allocation and the second instance identifier corresponds to a media component instance or a media sub-component instance for making the policy rule instance. The sending module is configured to send a second message indicating the resource allocation result to an application function (AF) entity, where the second message carries the second instance identifier.

In an implementation mode, the first receiving module includes a first receiving unit or a second receiving unit. The first receiving unit is configured to receive the first message indicating the resource allocation result from a policy and charging enforcement function (PCEF) entity. The second receiving unit, configured to receive the first message indicating the resource allocation result from a bearer binding and event report function (BBERF) entity.

In an implementation mode, the apparatus further includes a second receiving module or an allocation module. The second receiving module is configure to receive the second instance identifier allocated by the AF entity before the first receiving module determines the second instance identifier according to the first instance identifier in the first message. The allocation module is configured to allocate the second instance identifier to the media component instance or the media sub-component instance.

In an implementation mode, the second receiving module is configured to receive the second instance identifier allocated by the AF entity to the media component instance. The apparatus further includes a rule making module, configured to make one or more PCC rule instances according to the media component instance, where the first instance identifier corresponding to the second instance identifier is carried in the one or more PCC rule instances.

In an implementation mode, the allocation module is configured to: when one PCC rule instance is made according to the media component instance, allocate the second instance identifier to the media component instance, or, when one PCC rule instance is made according to one or more media sub-component instances, allocate the second instance identifier to the one or more media sub-component instances.

In an implementation mode, the first instance identifier carries indication information that a policy decision is triggered by traffic information or indication information that the second instance identifier corresponding to the first instance identifier exists.

In an implementation mode, the indication information is an identifier bit or a specific value range in values of the first instance identifier.

In an implementation mode, the first message further carries a rule identifier of the policy rule instance and the second message further carries an identifier of the media component instance or an identifier of the media sub-component instance, where the rule identifier is used for determining the media component instance or the media sub-component instance.

In an implementation mode, the sending module is further configured to return the second instance identifier to the AF entity and provide an identifier of the media component instance or the media sub-component instance for the AF entity after the allocation module allocates the second instance identifier to the media component instance.

Another embodiment of the present disclosure provides a policy control system. The system includes a policy and charging rules function (PCRF) entity and an AF entity. The PCRF entity includes a first receiving module and a sending module. The first receiving module is configured to receive a first message indicating a resource allocation result and determine, according to a first instance identifier in the first message, a corresponding second instance identifier, where the first instance identifier corresponds to a policy rule instance for executing resource allocation and the second instance identifier corresponds to a media component instance or a media sub-component instance for making the policy rule instance. The sending module is configured to send a second message indicating the resource allocation result to the AF entity, where the second message carries the second instance identifier. The AF entity is configured to receive the second message.

In an implementation mode, the AF entity is further configured to allocate the second instance identifier; or the PCRF entity is further configured to allocate the second instance identifier to the media component instance or the media sub-component instance.

Another embodiment of the present disclosure further provides a storage medium. The storage medium is configured to store program codes for executing the steps described below.

A first message indicating a resource allocation result is receives, and a corresponding second instance identifier is determined according to a first instance identifier in the first message, where the first instance identifier corresponds to a policy rule instance for executing resource allocation and the second instance identifier corresponds to a media component instance or a media sub-component instance for making the policy rule instance.

A second message indicating the resource allocation result is sent to an application function (AF) entity, where the second message carries the second instance identifier.

In the embodiments of the present disclosure, the first message indicating the resource allocation result is received, and the corresponding second instance identifier is determined according to the first instance identifier in the first message, where the first instance identifier corresponds to the policy rule instance for executing resource allocation and the second instance identifier corresponds to the media component instance or the media sub-component instance for making the policy rule instance; and the second message indicating the resource allocation result is sent to the application function (AF) entity, where the second message carries the second instance identifier. The present disclosure may enable the AF to accurately acquire the resource reservation result.

Other aspects can be understood after the drawings and detailed description are read and understood.

DETAILED DESCRIPTION

The present disclosure will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment 1

Figure 1:
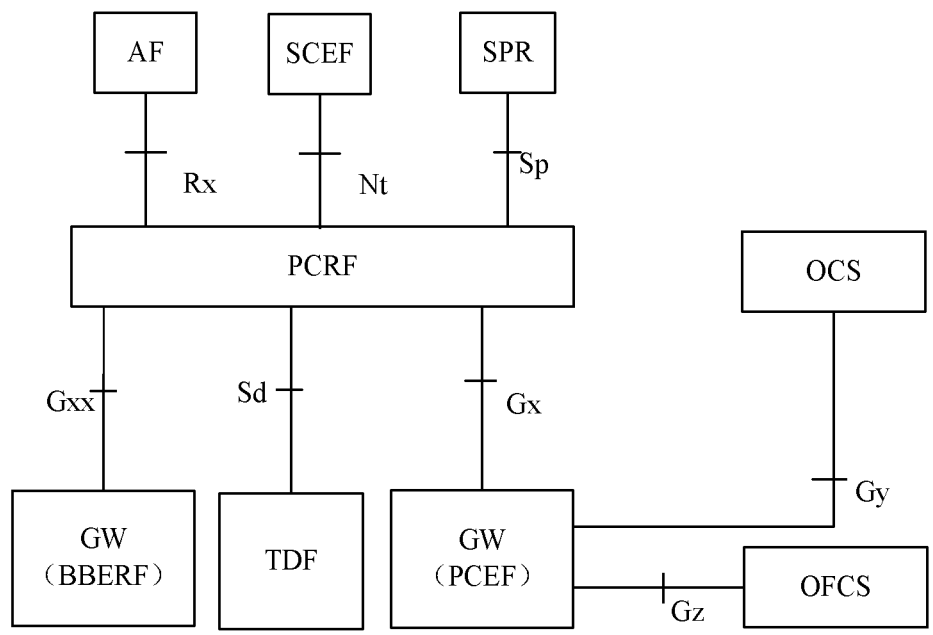
FIG. 1 is a schematic diagram of an PCC architecture defined in the 3GPP.
Figure 2:
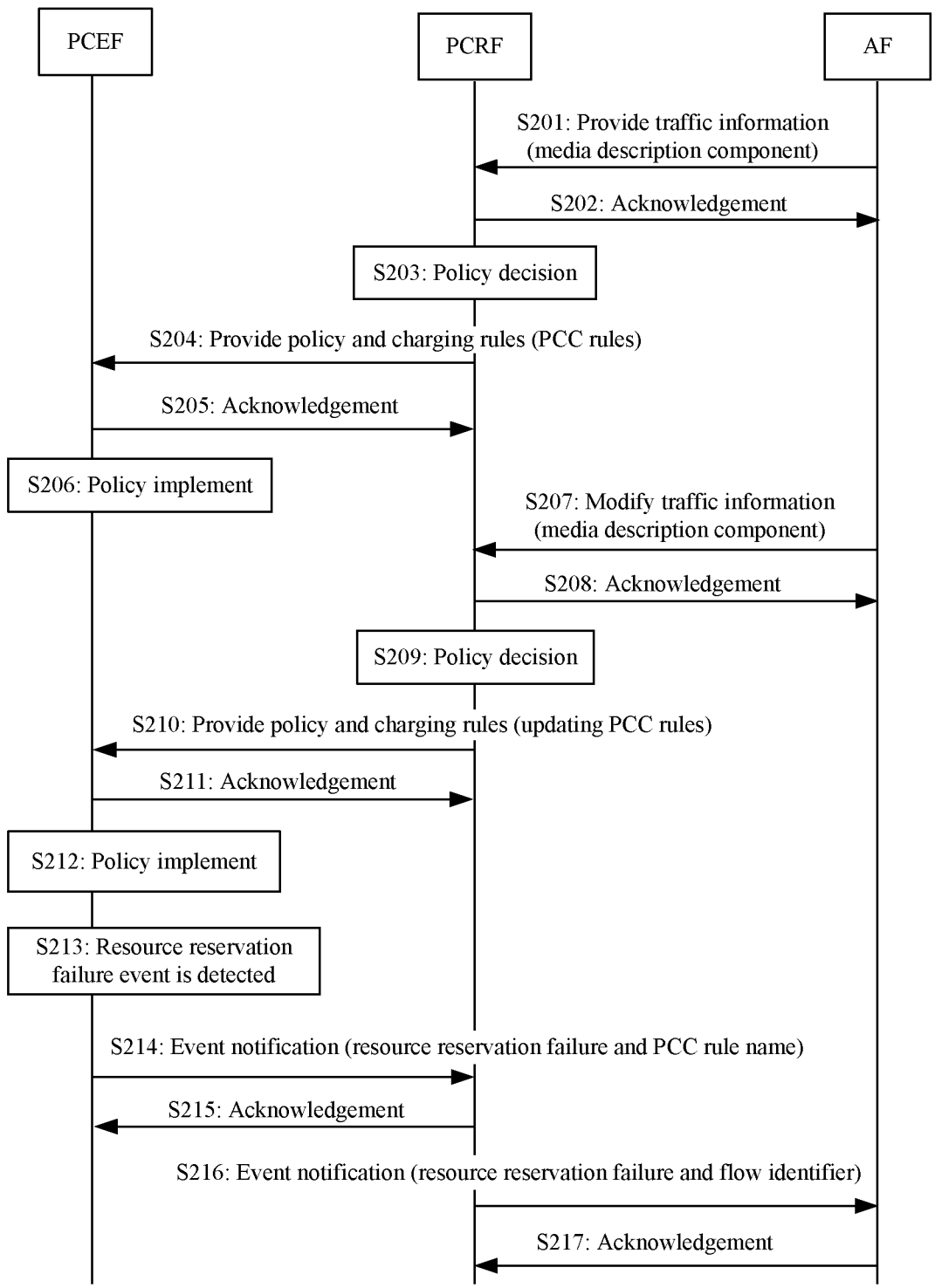
FIG. 2 is a flowchart of a process in which an AF requests a network QoS guarantee.
Figure 3:
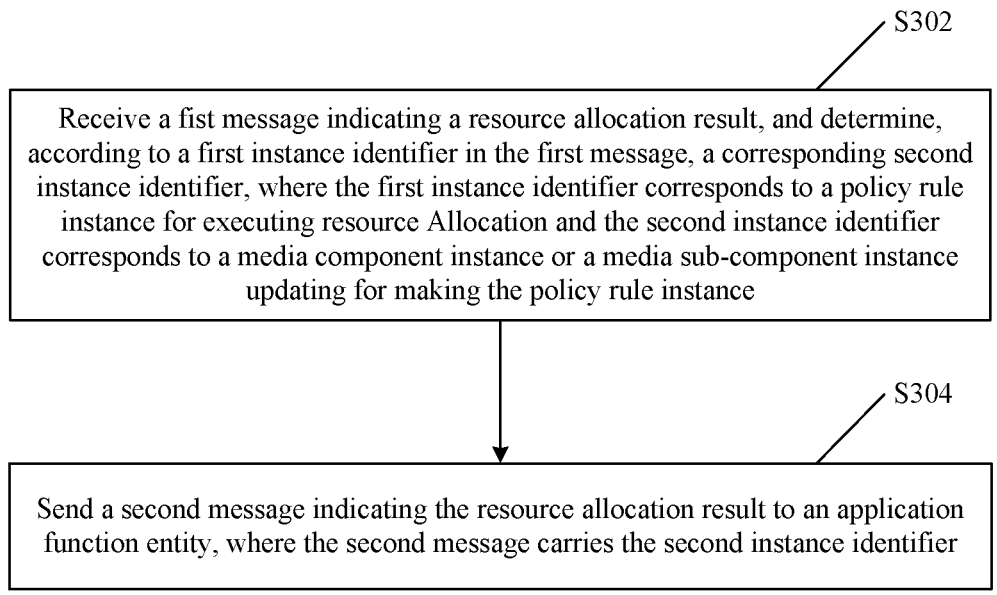
FIG. 3 is a flowchart of a policy control method according to an embodiment of the present disclosure.

The embodiment provides a policy control method executed on the network architecture shown in FIG. 1. FIG. 3 is a flowchart of a policy control method according to an embodiment of the present disclosure. As shown in FIG. 3, the method includes the steps described below.

In step S302, a first message indicating a resource allocation result is received, and a corresponding second instance identifier is determined according to a first instance identifier in the first message, where the first instance identifier corresponds to a policy rule instance for executing resource allocation and the second instance identifier corresponds to a media component instance or a media sub-component instance for making the policy rule instance.

In step S304, a second message indicating the resource allocation result is sent to an application function (AF) entity, where the second message carries the second instance identifier.

In the embodiment, the policy rule instance refers to an initial provision or a certain update of a policy; and the media component instance or the media sub-component instance refers to an initial provision or a certain update of a media component or a media sub-component.

In the above steps, the first message indicating the resource allocation result is received, and the corresponding second instance identifier is determined according to the first instance identifier in the first message, where the first instance identifier corresponds to the policy rule instance for executing resource allocation and the second instance identifier corresponds to the media component instance or the media sub-component instance for making the policy rule instance; and the second message indicating the resource allocation result is sent to the application function (AF) entity, where the second message carries the second instance identifier. The method may enable the AF to accurately acquire a resource reservation result.

In the embodiments of the present disclosure, the instance identifier may also be referred to as an update counter, a sequence number, a reference number or an update instance identifier.

In an implementation mode, the above steps may, but may not necessarily, be executed by a PCRF.

In an implementation mode, there are two ways to receive the first message indicating the resource allocation result: the first message indicating the resource allocation result is received from a policy and charging enforcement function (PCEF) entity; or the first message indicating the resource allocation result is received from a bearer binding and event report function (BBERF) entity.

In an implementation mode, the first instance identifier carries indication information that a policy decision is triggered by traffic information or indication information that the second instance identifier corresponding to the first instance identifier exists. The indication information is one or more identifier bits or one or more specific value ranges in values of the first instance identifier.

In an implementation mode, before the second instance identifier is determined according to the first instance identifier in the first message, the second instance identifier may also be allocated by an external node or the PCRF itself, which includes the step described below.

The second instance identifier allocated by the AF entity is received.

Or, the second instance identifier is allocated to the media component instance or the media sub-component instance.

In an implementation mode of the embodiment, when the second instance identifier allocated by the AF entity is received, the method may further include the steps described below.

In S11, the second instance identifier allocated by the AF entity to the media component instance is received.

In S12, one or more PCC rule instances are made according to the media component instance. The first instance identifier corresponding to the second instance identifier is carried in the one or more PCC rule instances.

In an implementation mode, the step of making one or more PCC rule instances according to the media component instance includes: when one PCC rule instance is made according to the media component instance and the media component instance carries a plurality of media sub-components, aggregating the plurality of media sub-components and making the one PCC rule instance; or when a plurality of PCC rule instances are made according to the media component instance, carrying the first instance identifier in each of the plurality of PCC rule instances.

In an implementation mode of the embodiment, when the second instance identifier is allocated to the media component instance or the media sub-component instance, the method may further include: when one PCC rule instance is made according to the media component instance, allocating the second instance identifier to the media component instance; or when one PCC rule instance is made according to one or more media sub-component instances, allocating the second instance identifier to the one or more media sub-component instances. In an implementation mode, after the second instance identifier is allocated to the media component instance, the second instance identifier is returned to the AF entity and an identifier of the media component instance or the media sub-component instance is provided to the AF entity.

In an implementation mode, before the first message indicating the resource allocation result has been received, the embodiment further includes: allocating the first instance identifier to the PCC rule instance, where the first instance identifier is determined according to the second instance identifier.

In an implementation mode of the embodiment, a relationship between the second instance identifier and the first instance identifier satisfies one of the following: a value of the second instance identifier is the same as a value of the first instance identifier; the value of the second instance identifier is calculated using the value of the first instance identifier according to configuration; and the value of the second instance identifier is obtained according to a correspondence between the first instance identifier and the second instance identifier stored by the PCRF.

In an implementation mode, the first message further carries a rule identifier of the policy rule instance and the second message further carries an identifier of the media component instance or an identifier of the media sub-component instance, where the rule identifier is used for determining the media component instance or the media sub-component instance. The rule identifier may be a rule name.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method according to each embodiment of the present disclosure.

Embodiment 2

The embodiment further provides a policy control apparatus and system for implementing the embodiments and implementation modes described above. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Figure 4:
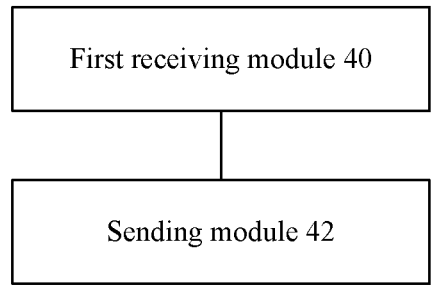
FIG. 4 is a block diagram of a policy control apparatus according to an embodiment of the present disclosure.

FIG. 4 is a block diagram of a policy control apparatus according to an embodiment of the present disclosure. As shown in FIG. 4, the apparatus includes a first receiving module 40 and a sending module 42.

The first receiving module 40 is configured to receive a first message indicating a resource allocation result and determine, according to a first instance identifier in the first message, a corresponding second instance identifier, where the first instance identifier corresponds to a policy rule instance executing resource allocation and the second instance identifier corresponds to a media component instance or a media sub-component instance making the policy rule instance.

The sending module 42 is configured to send a second message indicating the resource allocation result to an application function (AF) entity, where the second message carries the second instance identifier.

In an implementation mode, the first receiving module 40 further includes a first receiving unit or a second receiving unit. The first receiving unit is configured to receive the first message indicating the resource allocation result from a policy and charging enforcement function (PCEF) entity.

The second receiving unit is configured to receive the first message indicating the resource allocation result from a bearer binding and event report function (BBERF) entity.

In an implementation mode, the apparatus further includes a second receiving module or an allocation module. The second receiving module is configured to receive the second instance identifier allocated by the AF entity before the first receiving module determines the second instance identifier according to the first instance identifier in the first message. The allocation module is configured to allocate the second instance identifier to the media component instance or the media sub-component instance.

In an implementation mode, the second receiving module is configured to receive the second instance identifier allocated by the AF entity to the media component instance. The apparatus further includes a rule making module. The rule making module is configured to make one or more PCC rule instances according to the media component instance, where the first instance identifier corresponding to the second instance identifier is carried in the one or more PCC rule instances.

In an implementation mode, when making one PCC rule instance according to the media component instance, the allocation module is configured to allocate the second instance identifier to the media component instance, or, when making one PCC rule instance according to one or more media sub-component instances, the allocation module is configured to allocate the second instance identifier to the one or more media sub-component instances.

The sending module is further configured to return the second instance identifier to the AF entity and provide an identifier of the media component instance or the media sub-component instance to the AF entity after the allocation module allocates the second instance identifier to the media component instance.

In an implementation mode, the first instance identifier carries indication information that a policy decision is triggered by traffic information or indication information indicating the existence of the second instance identifier corresponding to the first instance identifier. The indication information is an identifier bit or a specific value range in values of the first instance identifier.

In an implementation mode, the first message further carries a rule identifier of the policy rule instance and the second message further carries an identifier of the media component instance or an identifier of the media sub-component instance, where the rule identifier is used for determining the media component instance or the media sub-component instance.

Figure 5:
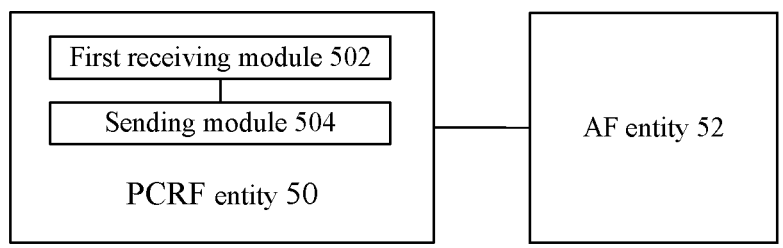
FIG. 5 is a block diagram of a policy control system according to an embodiment of the present disclosure.

FIG. 5 is a block diagram of a policy control system according to an embodiment of the present disclosure. As shown in FIG. 5, the system includes:

a policy and charging rules function (PCRF) entity 50 and an AF entity 52.

The PCRF entity includes a first receiving module 502 and a sending module 504.

The first receiving module 502 is configured to receive a first message indicating a resource allocation result and determine, according to a first instance identifier in the first message, a corresponding second instance identifier, where the first instance identifier corresponds to a policy rule instance executing resource allocation and the second instance identifier corresponds to a media component instance or a media sub-component instance making the policy rule instance.

The sending module 504 is configured to send a second message indicating the resource allocation result to the AF entity, where the second message carries the second instance identifier.

The AF entity 52 is configured to receive the second message.

In an implementation mode, the AF entity 52 is further configured to allocate the second instance identifier; or the PCRF entity 50 is further configured to allocate the second instance identifier to the media component instance or the media sub-component instance. That is, the second instance identifier may be obtained from the AF entity 52 and the PCRF entity 50.

It is to be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment 3

The embodiment provides a policy control method to enable an AF to accurately acquire a resource reservation result.

A policy and charging control method provided in the embodiment includes the steps described below.

The PCRF allocates a first instance identifier to a PCC rule. The first instance identifier carries an indication that the first instance identifier corresponds to a second instance identifier and the second instance identifier corresponds to traffic information for customizing the PCC rule.

After receiving a message indicating a resource allocation result sent by the BBERF or the PCEF, the PCRF determines the second instance identifier according to the first instance identifier in the message and sends the message indicating the resource allocation result, where the message carries the second instance identifier.

The second instance identifier is allocated by the AF or the PCRF.

When the second instance identifier is allocated by the AF, each media component instance in the traffic information is assigned with one second instance identifier by the AF, and the PCRF makes one or more PCC rule instances according to the media component instance and the one or more PCC rule instances carry the first instance identifiers of the same value.

When the second instance identifier is allocated by the PCRF, the media sub-component instances for making the same PCC rule instance are assigned with the second instance identifier of the same value by the PCRF.

The embodiment is described in detail below in conjunction with practical scenarios through the following four embodiments. It is to be noted that if not in collision, the embodiments and features therein in the present application may be combined with each other.

Embodiment One

Figure 6:
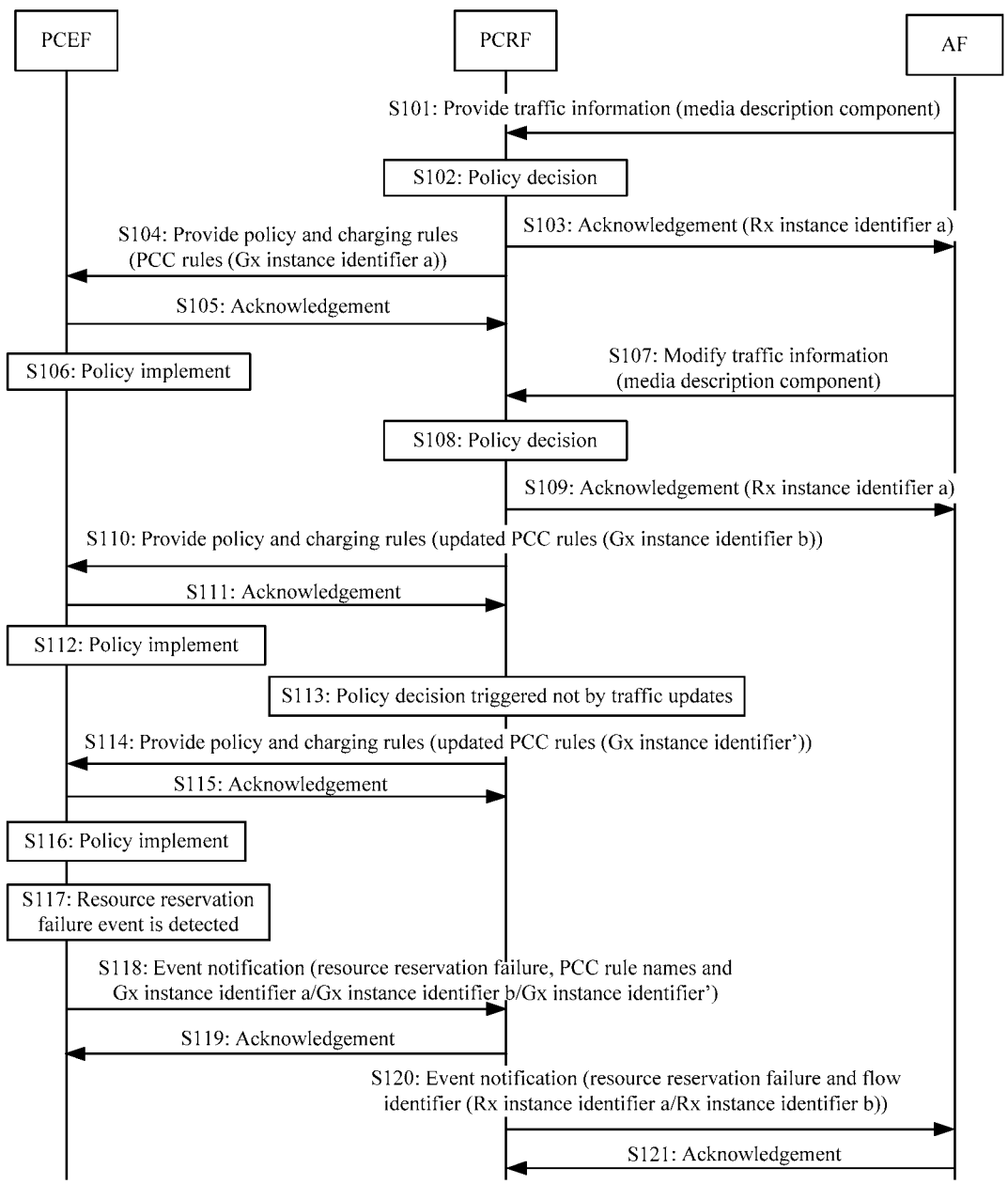
FIG. 6 is a flowchart of policy control according to an embodiment one of the present disclosure.

FIG. 6 is a flowchart of policy control according to an embodiment one of the present disclosure. A PCRF allocates Rx instance identifiers and the Rx instance identifiers are in one-to-one correspondence with Gx instance identifiers. The flow includes the steps described below.

In step 101, an AF sends traffic information to the PCRF. The traffic information is carried in a message, which includes one or more media components (carried in a Media-Component-Description AVP).

In step 102, the PCRF makes a policy decision and makes a PCC rule according to a network policy, the traffic information and user subscription information etc. In this process, the PCRF may need to interact with an SPR and acquire the user subscription information. When the PCRF makes the PCC rule, the PCRF may make one PCC rule according to one media sub-component (carried in a Media-Sub-Component AVP), that is, the PCRF will make two PCC rules if one Media-Component-Description AVP carries two Media-Sub-Component AVPs. Alternatively, the PCRF may also aggregate a plurality of Media Sub Components in one Media Component and make one PCC rule. If the PCRF makes one PCC rule according to one Media Sub Component, the PCRF will allocate one Rx instance identifier (reference number) to this Media Sub Component. Here this Rx instance identifier is denoted as an Rx instance identifier a). If the PCRF makes one PCC rule for two or more Media Sub Components, the PCRF will allocate one Rx instance identifier (reference number) to the two or more Media Sub Components. Here this Rx instance identifier is denoted as the Rx instance identifier a. If the PCRF makes one PCC rule for the Media Component, the PCRF will allocate one Rx instance identifier (reference number) to this Media Component (that is, a same reference number is allocated to all Media Sub Components in the Media Component). The Rx instance identifier a identifies an initial provision of the Media Component or the Media Sub Component (which may be regarded as an initial provision instance for identifying the Media Component or the Media Sub Component). Meanwhile, the Gx instance identifier is carried in the PCC rule and denoted as a Gx instance identifier a here. A value of the Gx instance identifier may be the same as a value of the Rx instance identifier or the value of the Gx instance identifier may be derived from the value of the Rx instance identifier. That is, the Gx instance identifier has the one-to-one correspondence with the Rx instance identifier. Similarly, the Gx instance identifier carries indication information of a policy decision triggered by the traffic information which means that the Gx instance identifier corresponds to the Rx instance identifier. In the practical implementation, the indication information may be an identifier bit set in values of the Gx instance identifier or a specific value range allocated in values of the Gx instance identifier. The Gx instance identifier a identifies an initial provision of the PCC rule (which may be regarded as an initial provision instance for identifying the PCC rule).

In step 103, the PCRF returns an acknowledgement message carrying a flow identifier (carried in a Flows AVP) and a corresponding Rx instance identifier (the Rx instance identifier a) which is carried in a Reference-Number AVP. If the PCRF allocates the same Reference Number to the Media Component, the Flows only needs to carry a Media Component Number of the Media Component (carried in a Media-Component-Number AVP) and the corresponding Rx instance identifier. If the PCRF allocates different Reference Numbers for different Media Sub Components in the Media Component, the Flows AVP also carries Flow Numbers of the Sub Components (carried in a Flow-Number AVP) and the corresponding Reference Numbers in addition to the Media Component Number of the Media Component. Through the acknowledgement message, the AF knows the Reference Number of each Media Sub Component.

Flows::=<AVP Header: 510>
{Media-Component-Number}
*[Flow-Number]
[Final-Unit-Action]
[Reference-Number]
[Media-Component-Status]
*[AVP]

In an implementation mode, once the PCRF allocates the Rx instance identifier to the Media-Sub-Component AVP, the PCRF may return a response message carrying the Rx instance identifier to the AF and then make the PCC rule.

In step 104, the PCRF provides the PCC rule made after the policy decision to a PCEF.

In step 105, the PCEF returns an acknowledgement message after installing the PCC rule.

In step 106, the PCEF initiates a resource reservation process according to the PCC rule.

In step 107, after the PCRF provides the PCC rule to the PCEF (the step 104), the PCRF receives updated traffic information which carries an updated media component (a new instance of the media component provided before). Generally, the AF only sends the media component that needs to be updated. The AF may also provide complete traffic information (including the updated media component and the non-updated media component).

In step 108, the PCRF makes the policy decision and updates the previous PCC rule according to the network policy, the traffic information and the user subscription information etc. If the updated media component is carried, the following steps are further performed. If a new Sub Component is added and a new PCC rule is made for the new Sub Component, the PCRF allocates a Gx instance identifier b to the PCC rule and allocates an Rx instance identifier b to the new Sub Component. If a new Sub-Component is added and the previous PCC rule is updated according to the new Sub Component, the PCRF allocates a new Gx instance identifier b to the updated PCC rule and allocates a new Rx instance identifier b to all Sub Components corresponding to the updated PCC rule. If an existing Sub Component is modified and the previous PCC rule is updated, the PCRF allocates a new Gx reference number b to the updated PCC rule and allocates the new Rx instance identifier b to all the Sub Components corresponding to the updated PCC rule. The value of the Gx instance identifier b may be the same as the value of the Rx instance identifier b or the value of the Gx instance identifier b and the value of the Rx instance identifier b may be derived from each other. That is, the Gx instance identifier b has the one-to-one correspondence with the Rx instance identifier b. Similarly, the Gx instance identifier carries the indication information of the policy decision triggered by the traffic information which means that the Gx instance identifier corresponds to the Rx instance identifier. In the practical implementation, the indication information may be an identifier bit set in values of the Gx instance identifier or a specific value range allocated in values of the Gx instance identifier. The Rx instance identifier b identifies a first update of the Media Component or the Media Sub Component (which may be regarded as a first update instance for identifying the Media Component or the Media Sub Component). The Gx instance identifier b identifies a first update of the PCC rule (which may be regarded as a first update instance for identifying the PCC rule).

In step 109, the PCRF returns an acknowledgement message carrying the flow identifier (carried in the Flows AVP) and the corresponding Rx instance identifier b which is carried in the Reference-Number AVP. If the PCRF allocates the same Reference Number to the Media Component, the Flows only needs to carry the Media Component Number of the Media Component (carried in the Media-Component-Number AVP) and the corresponding Rx instance identifier b. If the PCRF allocates different Rx instance identifiers a for different Media Sub Components in the Media Component, the Flows AVP also carries the Flow Numbers of the Sub Components (carried in the Flow-Number AVP) and the corresponding Rx instance identifiers b in addition to the Media Component Number of the Media Component. Through the acknowledgement message, the AF knows the instance identifier of each Media Sub Component.

Flows::=<AVP Header: 510>
{Media-Component-Number}
*[Flow-Number]
[Final-Unit-Action]
[Reference-Number]
[Media-Component-Status]
*[AVP]

In an implementation mode, once the PCRF allocates the Rx instance identifier to the Media-Sub-Component AVP, the PCRF may return the response message carrying the Rx instance identifier to the AF and then make the PCC rule.

In step 110, the PCRF provides the updated PCC rule to the PCEF, where the updated PCC rule carries the Gx instance identifier b.

In step 111, the PCEF returns an acknowledgement message after installing the PCC rule.

In step 112, the PCRF initiates the resource reservation process according to the installed PCC rule.

In step 113, after step 110, the PCRF may need to further update the PCC rule for some reason (such as a change of the network policy, a change of the user subscription and a change of an access network). The PCRF makes the policy decision, updates the PCC rule and carries a new Gx instance identifier (here denoted as a Gx instance identifier') in the PCC rule. The Gx instance identifier here carries the indication information of the policy decision not triggered by the traffic information which means that the Gx instance identifier does not correspond to one Rx instance identifier. In the practical implementation, the indication information may be an identifier bit set in values of the Gx instance identifier or a specific value range allocated in values of the Gx instance identifier (that is, the Gx instance identifier corresponding to the Rx instance identifier and the Gx instance identifier not corresponding to the Rx instance identifier are in different value ranges). The Gx instance identifier' identifies a second update of the PCC rule (which may be regarded as a first update instance for identifying the PCC rule).

In step 114, the PCRF provides the updated PCC rule to the PCEF, where the updated PCC rule carries the Gx instance identifier'.

In step 115, the PCEF returns an acknowledgement message after installing the PCC rule.

In step 116, the PCRF initiates the resource reservation process according to the installed PCC rule.

In step 117, the PCEF receives a response message of the resource reservation process which indicates a resource reservation failure.

In step 118, the PCEF sends an event notification to the PCRF, where the event notification carries a resource reservation failure indication (carried in an Event-Trigger AVP) and the corresponding PCC rule (carried in a Charging-Rule-Report AVP). If the failure indication received by the PCEF in step 117 is a response for the resource reservation process initiated by the PCEF in step 106, a message sent by the PCEF to the PCRF further carries the Gx instance identifier a (carried in the Reference-Number AVP). If the failure indication received by the PCEF in step 117 is a response for the resource reservation process initiated by the PCEF in step 112, the message sent by the PCEF to the PCRF further carries the Gx instance identifier b (carried in the Reference-Number AVP). If the failure indication received by the PCEF in step 117 is a response for the resource reservation process initiated by the PCEF in step 116, the message sent by the PCEF to the PCRF further carries the Gx instance identifier' (carried in the Reference-Number AVP). The Reference-Number AVP is carried in the Charging-Rule-Report AVP.

Charging-Rule-Report::=<AVP Header: 1018>
*[Charging-Rule-Name]
*[Charging-Rule-Base-Name]
[Bearer-Identifier]
[PCC-Rule-Status]
[Rule-Failure-Code]
[Final-Unit-Indication]
*[RAN-NAS-Release-Cause]
[Reference-Number]
*[AVP]

In step 119, the PCRF returns an acknowledgement message to the PCEF.

In step 120, if the Gx instance identifier reported by the PCEF is the Gx instance identifier a or the Gx instance identifier b, the PCRF determines the Rx instance identifier a or the Rx instance identifier b according to the Gx instance identifier a or the Gx instance identifier b. (The PCRF may derive the Rx instance identifier from the Gx instance identifier according to configuration). The PCRF sends the event notification to the AF, which carries the resource reservation failure indication (carried in a Specific-Action AVP) and the flow identifier (carried in the Flows AVP). If the PCRF receives the Gx instance identifier a in step 114, the Flows AVP carries the corresponding Rx instance identifier a. If the PCRF receives the Gx instance identifier b, the Flows AVP carries the corresponding Rx instance identifier b. In this way, according to whether the Rx instance identifier a or the Rx instance identifier b is received, the AF can determine which traffic information provision corresponds to the resource allocation failure. (Here a description is given using an example in which the resource allocation result is a failure.)

In step 121, the AF returns an acknowledgement message to the PCRF.

In the above embodiment, the AF continuously provides the traffic information for only two times, and the solution is similar for a scenario in which the AF continuously provides the traffic information three or more times. For each traffic update, the PCRF allocates the Rx instance identifier and the Gx instance identifier according to an allocation principle thereof.

In the above embodiment, the Rx instance identifier and the Gx instance identifier are allocated by the PCRF when the AF initially provides the traffic information, and the Rx instance identifier and the Gx instance identifier are reported after the resource allocation according to the initially provided traffic information fails. In other embodiments, the instance identifiers may not be allocated when the traffic information is initially provided. In this way, once the instance identifier is not carried in the reporting information, it indicates that the resource allocation according to the initially provided traffic information fails.

In the above embodiment, the PCRF does not need to store an actual correspondence between the Gx instance identifier and the Rx instance identifier, but the PCRF may derive the Rx instance identifier according to the Gx instance identifier and according to a configuration method. Certainly, the PCRF may also store a correspondence between a Gx reference number and an Rx reference number to achieve mutual mapping.

The PCRF updates the formulated PCC rule according to a new instance of the media component or media sub-component, which may be regarded as making a new instance of the PCC rule according to the new instance of the media component or the media sub-component.

Embodiment Two

Figure 7:
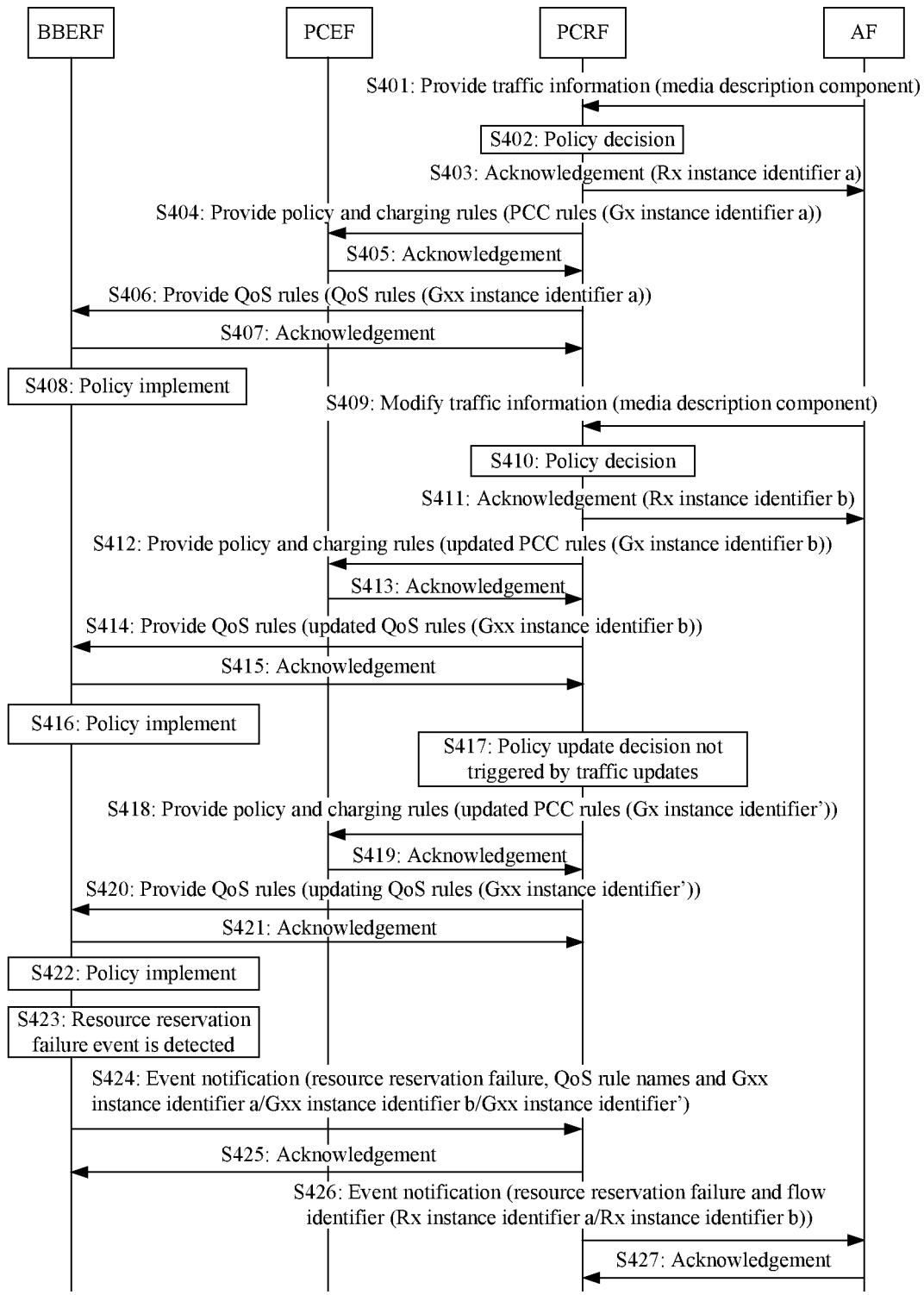
FIG. 7 is a flowchart of policy control according to an embodiment two of the present disclosure.

FIG. 7 is a flowchart of policy control according to an embodiment two of the present disclosure. The flow includes the steps described below.

In step 401, an AF provides traffic information to a PCRF. The traffic information carried in a message includes one or more media components (carried in a Media-Component-Description AVP).

In step 402, the PCRF makes a policy decision and formulates a PCC rule according to a network policy, the traffic information and user subscription information etc. In this process, the PCRF may need to interact with an SPR and acquire the user subscription information. When the PCRF formulates the PCC rule, the PCRF may formulate one PCC rule according to one media sub-component (carried in a Media-Sub-Component AVP), that is, the PCRF will formulate two PCC rules if one Media-Component-Description AVP carries two Media-Sub-Component AVPs. The PCRF may aggregate a plurality of Media Sub Components in one Media Component and formulate one PCC rule. If the PCRF formulates one PCC rule according to one Media Sub Component, the PCRF will allocate one Rx instance identifier (reference number) to this Media Sub Component. Here this Rx instance identifier is denoted as an Rx instance identifier a). If the PCRF formulates one PCC rule for two or more Media Sub Components, the PCRF will allocate one Rx instance identifier (reference number) to the two or more Media Sub Components. Here this Rx instance identifier is denoted as the Rx instance identifier a. If the PCRF formulate one PCC rule according to the Media Component, the PCRF will allocate one Rx instance identifier (reference number) to this Media Component (that is, a same reference number is allocated to all Media Sub Components in the Media Component). Meanwhile, a Gx instance identifier is carried in the PCC rule and is denoted as a Gx instance identifier a; and a Gxx instance identifier is carried in a QoS rule and is denoted as a Gxx instance identifier a. A value of the Gx instance identifier is the same as a value of the Gxx instance identifier. The value of the Gx/Gxx instance identifier may be the same as a value of the Rx instance identifier or the value of the Gx/Gxx instance identifier may be derived from the value of the Rx instance identifier. That is, the Gx/Gxx instance identifier has a one-to-one correspondence with the Rx instance identifier. Moreover, the Gx/Gxx instance identifier carries indication information of the policy decision triggered by the traffic information, that is, the Gx/Gxx instance identifier corresponds to the Rx instance identifier. In the practical implementation, the indication information may be an identifier bit set in the values of the Gx instance identifier or a specific value range allocated in values of the Gx instance identifier. The Rx instance identifier a identifies an initial provision of the Media Component or the Media Sub Component (which may be regarded as an initial provision instance for identifying the Media Component or the Media Sub Component). The Gx/Gxx instance identifier a identifies an initial provision of the PCC/QoS rule (which may be regarded as an initial provision instance for identifying the PCC/QoS rule).

In step 403, the PCRF returns an acknowledgement message carrying a flow identifier (carried in a Flows AVP) and the corresponding Rx instance identifier which is carried in a Reference-Number AVP. If the PCRF allocates the same Reference Number to the Media Component, Flows only needs to carry a Media Component Number of the Media Component (the Media Component Number is carried in a Media-Component-Number AVP) and the corresponding Rx instance identifier. If the PCRF allocates different Reference Numbers for different Media Sub Components in the Media Component, the Flows AVP also carries Flow Numbers of the Sub Components (carried in a Flow-Number AVP) and the corresponding Reference Numbers in addition to the Media Component Number of the Media Component. Through the acknowledgement message, the AF knows the Reference Number of each Media Sub Component.

Flows::=<AVP Header: 510>
    {Media-Component-Number}
    *[Flow-Number]
    [Final-Unit-Action]
    [Reference-Number]
    [Media-Component-Status]
    *[AVP]

In an implementation mode, once the PCRF allocates the Rx instance identifier to the Media Sub Component, the PCRF may return a response message carrying the Rx instance identifier to the AF and then formulate the PCC/QoS rule.

In step 404, the PCRF provides the PCC rule formulated after the policy decision to a PCEF.

In step 405, the PCEF returns an acknowledgement message after installing the PCC rule.

In step 406, the PCRF provides the QoS rule to a BBERF.

In step 407, the BBERF returns an acknowledgement message.

In step 408, the PCEF initiates a resource reservation process according to the QoS rule.

In step 409, after the PCRF provides the QoS rule to the BBERF (the step 406), the PCRF receives updated traffic information which carries an updated media component (a new instance of the media component provided before). Generally, the AF only sends the to-be-updated media description component. The AF may also provide complete traffic information (including the updated media component and the non-updated media component).

In step 410, the PCRF makes the policy decision and updates the previous PCC rule according to the network policy, the traffic information and the user subscription information etc. If the updated media component is carried, the following steps are further performed. If a new Sub Component is added and a new PCC/QoS rule is formulated for the new Sub Component, the PCRF allocates a Gx instance identifier b to the PCC rule, allocates a Gxx instance identifier b to the QoS rule and allocates an Rx instance identifier b to the new Sub Component. If a new Sub-Component is added and the previous PCC/QoS rule is updated according to the new Sub Component, the PCRF allocates a new Gx instance identifier b/Gxx instance identifier b to the updated PCC/QoS rule and allocates a new Rx instance identifier b to all Sub Components corresponding to the updated PCC/QoS rule. If an existing Sub Component is modified and the previous PCC/QoS rule is updated, the PCRF allocates a new Gx reference number b/Gxx instance identifier b to the updated PCC/QoS rule and allocates the new Rx instance identifier b to all the Sub Components corresponding to the updated PCC/QoS rule. A value of the Gx/Gxx instance identifier b may be the same as a value of the Rx instance identifier b or the value of the Gx/Gxx instance identifier b and the value of the Rx instance identifier b may be derived from each other. That is, the Gx/Gxx instance identifier b has the one-to-one correspondence with the Rx instance identifier b. Similarly, the Gx/Gxx instance identifier b carries the indication information of the policy decision triggered by the traffic information, that is, the Gx instance identifier corresponds to the Rx instance identifier. In the practical implementation, the indication information may be an identifier bit set in values of the Gx instance identifier or a specific value range allocated in values of the Gx instance identifier. The Rx instance identifier b identifies a first update of the Media Component or the Media Sub Component (which may be regarded as a first update instance for identifying the Media Component or the Media Sub Component). The Gx/Gxx instance identifier b identifies a first update of the PCC/QoS rule (which may be regarded as a first update instance for identifying the PCC/QoS rule).

In step 411, the PCRF returns an acknowledgement message carrying the flow identifier (carried in the Flows AVP) and the corresponding Rx instance identifier a which is carried in the Reference-Number AVP. If the PCRF allocates the same Reference Number to the Media Component, Flows only needs to carry the Media Component Number of the Media Component (carried in the Media-Component-Number AVP) and the corresponding Rx instance identifier b. If the PCRF allocates different Rx instance identifiers b for different Media Sub Components in the Media Component, the Flows AVP also carries the Flow Numbers of the Sub Components (carried in the Flow-Number AVP) and the corresponding Rx instance identifiers b in addition to the Media Component Number of the Media Component. Through the acknowledgement message, the AF knows the instance identifier of each Media Sub Component.

In step 412, the PCRF provides the updated PCC rule to the PCEF, where the updated PCC rule carries the Gx instance identifier a.

In step 413, the PCEF returns an acknowledgement message after installing the PCC rule.

In step 414, the PCRF provides the QoS rule to the BBERF.

In step 415, the BBERF returns an acknowledgement message to the PCRF after installing the QoS rule.

In step 416, the PCRF initiates the resource reservation process according to the installed QoS rule.

In step 417, after the step 414, the PCRF may need to further update the PCC rule for some reason (such as a change of the network policy, a change of user subscription and a change of an access network). The PCRF makes the policy decision, updates the PCC/QoS rule and carries a new Gx instance identifier (here denoted as a Gx instance identifier') in the PCC rule and carries a new Gxx instance identifier (here denoted as a Gxx instance identifier') in the QoS rule. The Gx/Gxx instance identifier here carries the indication information of the policy decision not triggered by the traffic information, that is, the Gx/Gxx instance identifier does not correspond to the Rx instance identifier. In the practical implementation, the indication information may be an identifier bit set in values of the Gx/Gxx instance identifier or a specific value range allocated in values of the Gx/Gxx instance identifier (that is, the Gx/Gxx instance identifier corresponding to the Rx instance identifier and the Gx/Gxx instance identifier not corresponding to the Rx instance identifier are within different value ranges). The Gx/Gxx instance identifier' identifies a second update of the PCC/QoS rule (which may be regarded as a second update instance for identifying the PCC/QoS rule).

In step 418, the PCRF provides the updated PCC rule to the PCEF, where the updated PCC rule carries the Gx instance identifier'.

In step 419, the PCEF returns an acknowledgement message after installing the PCC rule.

In step 420, the PCRF provides the QoS rule for the BBERF.

In step 421, the BBERF returns an acknowledgement message to the PCRF after installing the QoS rule.

In step 422, the PCRF initiates the resource reservation process according to the installed BBERF rule.

In step 423, the BBERF receives a response message for the resource reservation process which indicates that the resource reservation process fails.

In step 424, the BBERF sends an event notification to the PCRF, where the event notification carries a resource reservation failure indication (carried in an Event-Trigger AVP) and the corresponding QoS rule (carried in a QoS-Rule-Report AVP). If a failure indication received by the BBERF in step 423 is a response for the resource reservation process initiated by the BBERF in step 408, a message sent by the BBERF to the PCRF further carries the Gxx instance identifier a (carried in the Reference-Number AVP). If the failure indication received by the BBERF in step 423 is a response for the resource reservation process initiated by the BBERF in step 416, the message sent by the BBERF to the PCRF further carries the Gxx instance identifier b (carried in the Reference-Number AVP). If the failure indication received by the BBERF in step 423 is a response for the resource reservation process initiated by the BBERF in step 422, the message sent by the BBERF to the PCRF further carries the Gx instance identifier' (carried in the Reference-Number AVP). The Reference-Number AVP is carried in the QoS-Rule-Report AVP.

QoS-Rule-Report::=<AVP Header: 1055>
*[QoS-Rule-Name]
*[QoS-Rule-Base-Name]
[PCC-Rule-Status]
[Rule-Failure-Code]
[Reference-Number]
*[AVP]

In step 425, the PCRF returns an acknowledgement message to the BBERF.

In step 426, if the Gxx instance identifier reported by the BBERF is the Gxx instance identifier a or the Gxx instance identifier b, the PCRF determines the Rx instance identifier a or the Rx instance identifier b according to the Gxx instance identifier a or the Gxx instance identifier b. The PCRF sends the event notification to the AF, where the event notification carries the resource reservation failure indication (carried in a Specific-Action AVP) and the flow identifier (carried in the Flows AVP). If the PCRF receives the Gxx instance identifier a in step 424, the Flows AVP carries the corresponding Rx instance identifier a. If the PCRF receives the Gxx instance identifier b, the Flows AVP carries the corresponding Rx instance identifier b. In this way, according to the Rx instance identifier a and the Rx instance identifier b, the AF can determine which traffic information provision corresponds to the resource allocation failure.

In step 427, the AF returns an acknowledgement message to the PCRF.

The above embodiment only describes a scenario in which the AF continuously provides the traffic information twice, and the solution is similar for a scenario in which the AF continuously provides the traffic information three or more times. For each traffic update, the PCRF allocates the Rx instance identifier and the Gx instance identifier according to an allocation principle thereof.

In the above embodiment, the Rx instance identifier and the Gx/Gxx instance identifier are allocated by the PCRF when the AF initially provides the traffic information, and the PCRF reports the corresponding Rx instance identifier and Gx/Gxx instance identifier after the resource allocation according to the initially provided traffic information fails. In other embodiments, the instance identifiers may not be allocated when the traffic information is initially provided. In this way, once the instance identifier is not carried in the reported information, it indicates that the resource allocation according to the initially provided traffic information fails.

The PCRF updates the formulated PCC/QoS rule according to a new instance of the media component or media sub-component, which may be regarded as making a new instance of the PCC/QoS rule according to the new instance of the media component or the media sub-component.

Embodiment Three

Figure 8:
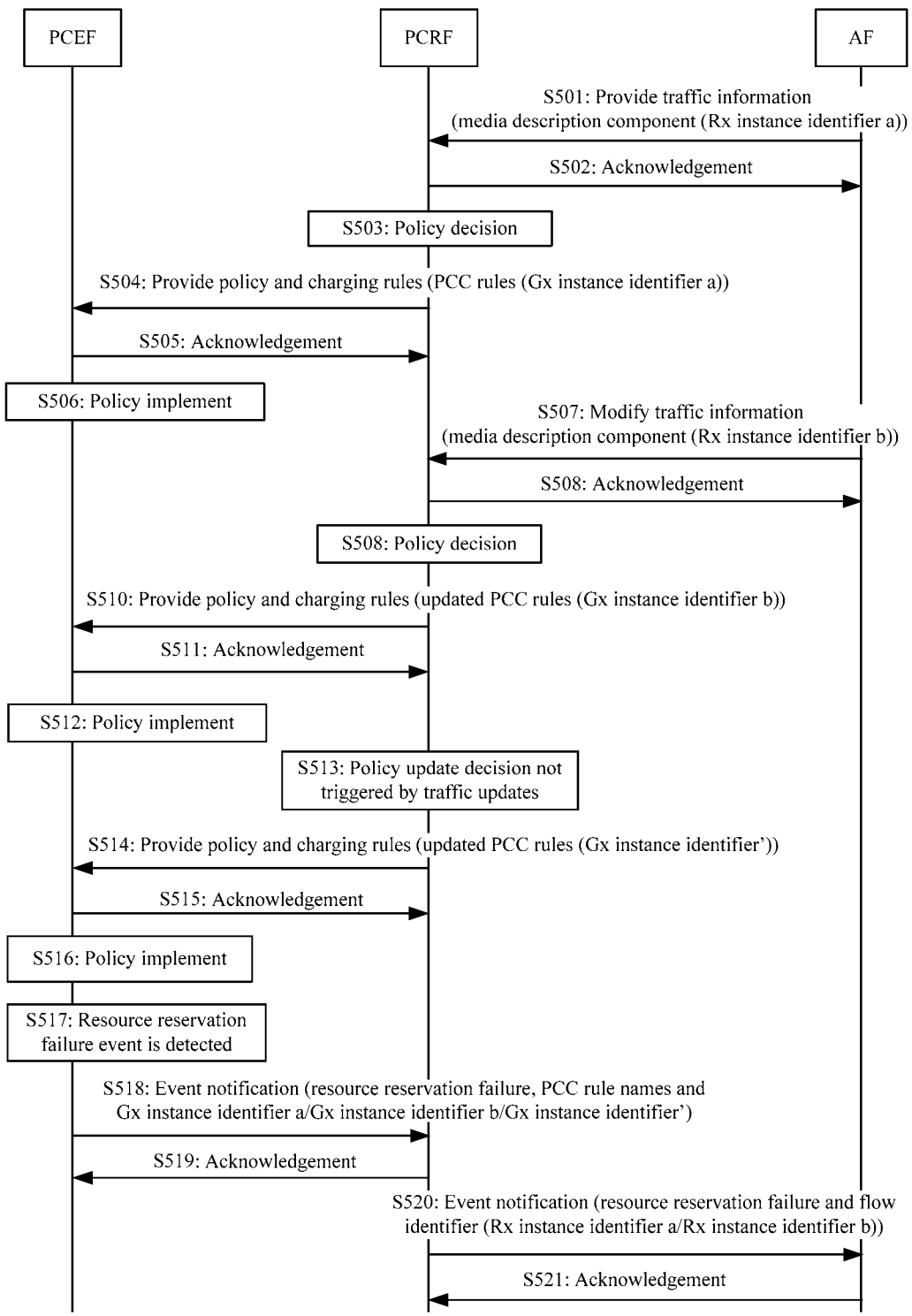
FIG. 8 is a flowchart of policy control according to an embodiment three of the present disclosure.

FIG. 8 is a flowchart of policy control according to an embodiment three of the present disclosure. In the embodiment, an AF allocates an Rx instance identifier. The policy control process includes the steps described below.

In step 501, the AF provides traffic information to a PCRF. A message carries the traffic information and includes one or more media components (carried in a Media-Component-Description AVP). The AF may allocate one Rx instance identifier for one media component and the Rx instance identifier is designated as Rx instance identifier a.

In step 502, the PCRF stores the traffic information and returns an acknowledgement message.

In step 503, the PCRF makes a policy decision and formulates a PCC rule according to a network policy, the traffic information and user subscription information etc. In this process, the PCRF may need to interact with an SPR and acquire the user subscription information. When the PCRF formulates the PCC rule, the PCRF may formulate one PCC rule according to one media sub-component (carried in a Media-Sub-Component AVP), that is, the PCRF will formulate two PCC rules if one Media-Component-Description AVP carries two Media-Sub-Component AVPs. The PCRF may also aggregate a plurality of Media Sub Components in one Media Component and formulate one PCC rule. Meanwhile, a Gx instance identifier is carried in the PCC rule and designated as Gx instance identifier a here. If the PCRF formulates a plurality of PCC rules according to one media component, the PCRF carries the same Gx instance identifier in each of the plurality of PCC rules. A value of the Gx instance identifier may be the same as a value of the Rx instance identifier or the value of the Gx instance identifier may be derived according to the value of the Rx instance identifier. That is, the Gx instance identifier has a one-to-one correspondence with the Rx instance identifier. Similarly, the Gx instance identifier carries indication information of the policy decision triggered by the traffic information, that is, the Gx instance identifier corresponds to the Rx instance identifier. In the practical implementation, the indication information may be an identifier bit set in values of the Gx instance identifier or a specific value range in the values of the Gx instance identifier. The Rx instance identifier a identifies an initial provision of the Media Component (which may be regarded as an initial provision instance for identifying the Media Component). The Gx instance identifier a identifies an initial provision of the PCC rule (which may be regarded as an initial provision instance for identifying the PCC rule).

In step 504, the PCRF provides the PCC rule formulated after the policy decision to a PCEF.

In step 505, the PCEF returns an acknowledgement message after installing the PCC rule.

In step 506, the PCEF initiates a resource reservation process according to the PCC rule.

In step 507, after the PCRF provides the PCC rule to the PCEF (the step 504), the PCRF receives updated traffic information which carries an updated media component (namely, a new instance of the media component provided before). Generally, the AF only sends the updated media component. The AF may allocate a new Rx instance identifier for the updated media component and the new Rx instance identifier is designated as Rx instance identifier b. The AF may also provide complete traffic information (including the updated media component and the non-updated media component).

In step 508, the PCRF stores the traffic information and returns an acknowledgement message.

In step 509, the PCRF makes the policy decision and updates the previous PCC rule according to the network policy, the traffic information and the user subscription information etc. If the updated media component is carried, the following steps are further performed. If a new Sub Component is added and a new PCC rule is formulated for the new Sub Component, the PCRF allocates a Gx instance identifier b to the PCC rule. If a new Sub-Component is added and the previous PCC rule is updated according to the new Sub Component, the PCRF allocates a new Gx instance identifier b to the updated PCC rule. If an existing Sub Component is modified and the previous PCC rule is updated, the PCRF allocates a new Gx reference number b to the updated PCC rule. Similarly, if the PCRF formulates a plurality of PCC rules according to the updated media component, the plurality of PCC rules carry the same Gx instance identifier. A value of the Gx instance identifier b may be the same as a value of the Rx instance identifier b, or the value of the Gx instance identifier b and the value of the Rx instance identifier b may be derived from each other. That is, the Gx instance identifier b has the one-to-one correspondence with the Rx instance identifier b. Similarly, the Gx instance identifier carries the indication information of the policy decision triggered by the traffic information, that is, the Gx instance identifier corresponds to one Rx instance identifier. In the practical implementation, the indication information may be an identifier bit set in values of the Gx instance identifier or a specific value range in the values of the Gx instance identifier. The Rx instance identifier b identifies a first update of the Media Component (which may be regarded as a first update instance for identifying the Media Component). The Gx instance identifier b identifies a first update of the PCC rule (which may be regarded as a first update instance for identifying the PCC rule).

In step 510, the PCRF provides the updated PCC rule to the PCEF, where the updated PCC rule carries the Gx instance identifier b.

In step 511, the PCEF returns an acknowledgement message after installing the PCC rule.

In step 512, the PCEF initiates the resource reservation process according to the installed PCC rule.

In step 513, after step 510, the PCRF may need to further update the PCC rule for some reason (such as a change of the network policy, a change of user subscription and a change of a access network). The PCRF makes the policy decision, updates the PCC rule, and makes the PCC rule to carry a new Gx instance identifier (here designated as a Gx instance identifier'). The Gx instance identifier here carries the indication information of the policy decision not triggered by the traffic information which means that the Gx instance identifier does not correspond to the Rx instance identifier. In the practical implementation, the indication information may be an identifier bit set in values of the Gx instance identifier or a specific value range in the values of the Gx instance identifier (that is, the Gx instance identifier corresponding to the Rx instance identifier and the Gx instance identifier not corresponding to the Rx instance identifier are within different value ranges). The Gx instance identifier' identifies a second update of the PCC rule (which may be regarded as a second update instance for identifying the PCC rule).

In step 514, the PCRF provides the updated PCC rule to the PCEF, where the updated PCC rule carries the Gx instance identifier'.

In step 515, the PCEF returns an acknowledgement message after installing the PCC rule.

In step 516, the PCEF initiates the resource reservation process according to the installed PCC rule.

In step 517, the PCEF receives a response message for the resource reservation process which indicates a resource reservation failure.

In step 518, the PCEF sends an event notification to the PCRF, where the event notification carries a resource reservation failure indication (carried in an Event-Trigger AVP) and the corresponding PCC rule (carried in a Charging-Rule-Report AVP). If the failure indication received by the PCEF in step 517 is a response for the resource reservation process initiated by the PCEF in step 506, the message sent by the PCEF to the PCRF further carries the Gx instance identifier a (carried in a Reference-Number AVP). If the failure indication received by the PCEF in step 517 is a response for the resource reservation process initiated by the PCEF in step 512, the message sent by the PCEF to the PCRF further carries the Gx instance identifier b (carried in the Reference-Number AVP). If the failure indication received by the PCEF in step 517 is a response for the resource reservation process initiated by the PCEF in step 516, the message sent by the PCEF to the PCRF further carries the Gx instance identifier' (carried in the Reference-Number AVP). The Reference-Number AVP is carried in the Charging-Rule-Report AVP.

Charging-Rule-Report::=<AVP Header: 1018>
*[Charging-Rule-Name]
*[Charging-Rule-Base-Name]
[Bearer-Identifier]
[PCC-Rule-Status]
[Rule-Failure-Code]
[Final-Unit-Indication]
*[RAN-NAS-Release-Cause]
[Reference-Number]
*[AVP]

In step 519, the PCRF returns an acknowledgement message to the PCEF.

In step 520, if the Gx instance identifier reported by the PCEF is the Gx instance identifier a or the Gx instance identifier b, the PCRF determines the Rx instance identifier a or the Rx instance identifier b according to the Gx instance identifier a or the Gx instance identifier b. The PCRF sends the event notification to the AF, where the event notification carries the resource reservation failure indication (carried in a Specific-Action AVP) and a flow identifier (carried in a Flows AVP). If the PCRF receives the Gx instance identifier a in step 518, the Flows AVP carries the corresponding Rx instance identifier a. If the PCRF receives the Gx instance identifier b, the Flows AVP carries the corresponding Rx instance identifier b. In this way, according to which one of the Rx instance identifier a and the Rx instance identifier b is received, the AF may determine which traffic information provision corresponds to the resource allocation failure.

In step 521, the AF returns an acknowledgement message to the PCRF.

The above embodiment only describes a scenario in which the AF continuously provides the traffic information twice, and the solution is similar for a scenario in which the AF continuously provides the traffic information three or more times. For each traffic update, the PCRF allocates the Rx instance identifier and the Gx instance identifier according to an allocation principle thereof.

In the above embodiment, the Rx instance identifier and the Gx instance identifier are allocated by the PCRF when the AF initially provides the traffic information, and the Rx instance identifier and the Gx instance identifier are reported by the PCRF after the resource allocation according to the initially provided traffic information fails. In other embodiments, the instance identifiers may not be allocated when the traffic information is initially provided. In this way, once the instance identifier is not carried in the reported information, it indicates that the resource allocation according to the initially provided traffic information fails.

In the above embodiment, the PCRF does not need to store an actual correspondence between the Gx instance identifier and the Rx instance identifier, but the PCRF may derive the Rx instance identifier according to the Gx instance identifier according to a configuration method. Certainly, the PCRF may also store a correspondence between a Gx reference number and an Rx reference number to achieve mutual mapping. The PCRF updates the formulated PCC rule according to a new instance of the media component or media sub-component, which may be regarded as making a new instance of the PCC rule according to the new instance of the media component or the media sub-component.

Embodiment Four

Figure 9:
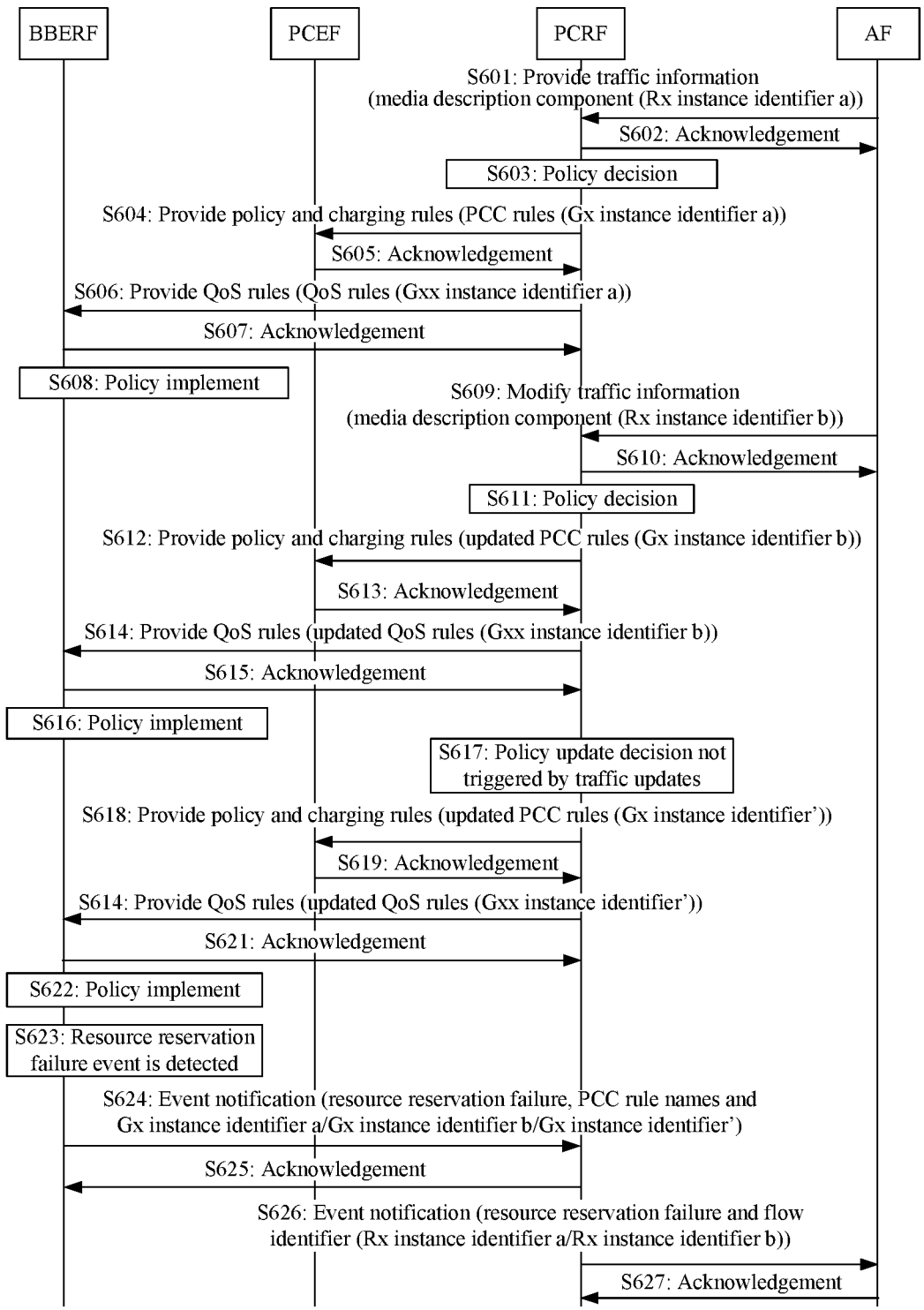
FIG. 9 is a flowchart of policy control according to an embodiment four of the present disclosure.

FIG. 9 is a flowchart of policy control according to an embodiment four of the present disclosure. The policy control process includes the steps described below.

In step 601, an AF provides traffic information to a PCRF. A message carries the traffic information which includes one or more media components (carried in a Media-Component-Description AVP). The AF may allocate one Rx instance identifier for one media component and the Rx instance identifier is designated as Rx instance identifier a.

In step 602, the PCRF stores the traffic information and returns an acknowledgement message.

In step 603, the PCRF makes a policy decision and formulates a PCC rule according to a network policy, the traffic information and user subscription information etc. In this process, the PCRF may need to interact with an SPR and acquire the user subscription information. When the PCRF formulates the PCC rule, the PCRF may formulate one PCC rule according to one media sub-component (carried in a Media-Sub-Component AVP) which means that the PCRF will formulate two PCC rules if one Media-Component-Description AVP carries two Media-Sub-Component AVPs. The PCRF may also aggregate a plurality of Media Sub Components in one Media Component and formulate one PCC rule. A Gx instance identifier is carried in the PCC rule and is designated as Gx instance identifier a; and a Gxx instance identifier is carried in a QoS rule and is designated as Gxx instance identifier a. A value of the Gx instance identifier is the same as a value of the Gxx instance identifier. If the PCRF formulates a plurality of PCC rules according to one media component, the PCRF carries the same Gx instance identifier in each of the plurality of PCC rules and carries the same Gxx instance identifier in the QoS rule. The value of the Gx/Gxx instance identifier may be the same as a value of the Rx instance identifier or the value of the Gx/Gxx instance identifier may be derived from the value of the Rx instance identifier. That is, the Gx/Gxx instance identifier has a one-to-one correspondence with the Rx instance identifier. Moreover, the Gx/Gxx instance identifier carries indication information of the policy decision triggered by the traffic information, which means that the Gx/Gxx instance identifier corresponds to the Rx instance identifier. In the practical implementation, the indication information may be an identifier bit set in values of the Gx instance identifier or a specific value range in the values of the Gx instance identifier. The Rx instance identifier a identifies an initial provision of the Media Component (which may be regarded as an initial provision instance for identifying the Media Component). The Gx/Gxx instance identifier a identifies an initial provision of the PCC/QoS rule (which may be regarded as an initial provision instance for identifying the PCC/QoS rule).

In step 604, the PCRF provides the PCC rule formulated after the policy decision to a PCEF.

In step 605, the PCEF returns an acknowledgement message after installing the PCC rule.

In step 606, the PCRF provides the QoS rule for a BBERF.

In step 607, the BBERF returns an acknowledgement message.

In step 608, the PCEF initiates a resource reservation process according to the QoS rule.

In step 609, after the PCRF provides the QoS rule to the BBERF (the step 606), the PCRF receives updated traffic information which carries an updated media component (that is, a new instance of the media component provided before). Generally, the AF only sends an updated media description component. The AF allocates one Rx instance identifier for one media component and the Rx instance identifier is designated by Rx instance identifier b. The AF may also provide complete traffic information (including the updated media component and the non-updated media component).

In step 610, the PCRF stores the traffic information and returns an acknowledgement message.

In step 611, the PCRF makes the policy decision and updates the previous PCC rule according to the network policy, the traffic information and the user subscription information etc. If the updated media component is carried, the following steps are further performed. If a new Sub Component is added and a new PCC/QoS rule is formulated for the new Sub Component, the PCRF allocates a Gx instance identifier b to the PCC rule and allocates a Gxx instance identifier b to the QoS rule. If a new Sub-Component is added and the previous PCC/QoS rule is updated according to the new Sub Component, the PCRF allocates a new Gx instance identifier b/Gxx instance identifier b to the updated PCC/QoS rule. If an existing Sub Component is modified and the previous PCC/QoS rule is updated, the PCRF allocates a new Gx reference number b/Gxx instance identifier b to the updated PCC/QoS rule. A value of the Gx/Gxx instance identifier b may be the same as a value of the Rx instance identifier b, or the value of the Gx/Gxx instance identifier b and the value of the Rx instance identifier b may be derived from each other. If the PCRF formulates a plurality of PCC rules according to one media component, the PCRF makes each PCC rule to carry the same Gx instance identifier and makes the QoS rule to carries the same Gxx instance identifier. That is, the Gx/Gxx instance identifier b has the one-to-one correspondence with the Rx instance identifier b. Similarly, the Gx/Gxx instance identifier b carries the indication information of the policy decision triggered by the traffic information, which means that the Gx instance identifier corresponds to the Rx instance identifier. In the implementation, the indication information may be set to an identifier bit or allocated with a specific value range in values of the Gx instance identifier. The Rx instance identifier b identifies a first update of the Media Component (which may be regarded as a first update instance for identifying the Media Component). The Gx/Gxx instance identifier b identifies a first update of the PCC/QoS rule (which may be regarded as a first update instance for identifying the PCC/QoS rule).

In step 612, the PCRF provides the updated PCC rule to the PCEF, where the updated PCC rule carries the Gx instance identifier [[a]]b.

In step 613, the PCEF returns an acknowledgement message after installing the PCC rule.

In step 614, the PCRF provides the QoS rule to the BBERF.

In step 615, the BBERF returns an acknowledgement message to the PCRF after installing the QoS rule.

In step 616, the PCRF initiates the resource reservation process according to the installed QoS rule.

In step 617, after step 614, the PCRF may need to further update the PCC rule for some reason (such as a change of the network policy, a change of user subscription and a change of a access network). The PCRF makes the policy decision, updates the PCC/QoS rule and carries a new Gx instance identifier (here designated by Gx instance identifier') in the PCC rule and carries a new Gxx instance identifier (here designated by Gxx instance identifier') in the QoS rule. The Gx/Gxx instance identifier carries the indication information of the policy decision not triggered by the traffic information, which indicates that the Gx/Gxx instance identifier does not correspond to the Rx instance identifier. In the practical implementation, the indication information may be set to an identifier bit or allocated with a specific value range in values of the Gx/Gxx instance identifier (that is, the Gx/Gxx instance identifier corresponding to the Rx instance identifier and the Gx/Gxx instance identifier not corresponding to the Rx instance identifier are within different value ranges). The Gx/Gxx instance identifier' identifies a second update of the PCC/QoS rule (which may be regarded as a second update instance for identifying the PCC/QoS rule).

In step 618, the PCRF provides the updated PCC rule to the PCEF, where the updated PCC rule carries the Gx instance identifier'.

In step 619, the PCEF returns an acknowledgement message after installing the PCC rule.

In step 620, the PCRF provides the QoS rule to the BBERF.

In step 621, the BBERF returns an acknowledgement message to the PCRF after installing the QoS rule.

In step 622, the BBERF initiates the resource reservation process according to the installed QoS rule.

In step 623, the BBERF receives a response message for the resource reservation process, and the response message indicates a resource reservation failure.

In step 624, the BBERF sends an event notification to the PCRF, where the event notification carries a resource reservation failure indication (carried in an Event-Trigger AVP) and the corresponding QoS rule (carried in a QoS-Rule-Report AVP). If the failure indication received by the BBERF in step 623 is a response for the resource reservation process initiated by the BBERF in step 608, the message sent by the BBERF to the PCRF further carries the Gxx instance identifier a (carried in a Reference-Number AVP). If the failure indication received by the BBERF in step 623 is a response for the resource reservation process initiated by the BBERF in step 616, the message sent by the BBERF to the PCRF further carries the Gxx instance identifier b (carried in the Reference-Number AVP). If the failure indication received by the BBERF in step 623 is a response for the resource reservation process initiated by the BBERF in step 622, the message sent by the BBERF to the PCRF further carries the Gx instance identifier' (carried in the Reference-Number AVP).

The Reference-Number AVP is carried in the QoS-Rule-Report AVP.

QoS-Rule-Report::=<AVP Header: 1055>
*[QoS-Rule-Name]
*[QoS-Rule-Base-Name]
[PCC-Rule-Status]
[Rule-Failure-Code]
[Reference-Number]
*[AVP]

In step 625, the PCRF returns an acknowledgement message to the BBERF.

In step 626, if the Gxx instance identifier reported by the BBERF is the Gxx instance identifier a or the Gxx instance identifier b, the PCRF determines the Rx instance identifier a or the Rx instance identifier b according to the Gxx instance identifier a or the Gxx instance identifier b. The PCRF sends the event notification to the AF, where the event notification carries the resource reservation failure indication (carried in a Specific-Action AVP) and a flow identifier (carried in a Flows AVP). If the PCRF receives the Gxx instance identifier a in step 424, the Flows AVP carries the corresponding Rx instance identifier a. If the PCRF receives the Gxx instance identifier b, the Flows AVP carries the corresponding Rx instance identifier b. In this way, according to which one of the Rx instance identifier a and the Rx instance identifier b is received, the AF may determine which traffic information provision corresponds to the resource allocation failure.

In step 627, the AF returns an acknowledgement message to the PCRF.

The above embodiment only describes a scenario in which the AF continuously provides the traffic information twice, and the solution is similar for a scenario in which the AF continuously provides the traffic information three or more times. For each traffic update, the PCRF allocates the Rx instance identifier and the Gx instance identifier according to an allocation principle thereof.

In the above embodiment, the Rx instance identifier and the Gx/Gxx instance identifier are allocated by the PCRF when the AF initially provides the traffic information, and the Rx instance identifier and the Gx/Gxx instance identifier are reported in response to determining that the resource allocation according to the initially provided traffic information fails. In other embodiments, the instance identifiers may not be allocated when the traffic information is initially provided. In this way, once the instance identifier is not carried in the reported information, it indicates that the resource allocation according to the initially provided traffic information fails.

The PCRF updates the formulated PCC rule according to a new instance of the media component or media sub-component, which may be regarded as making a new instance of the PCC rule according to the new instance of the media component or the media sub-component.

In all the embodiments described above, since the Gx/Gxx instance identifier carries the indication information that the policy decision is triggered by the traffic information or the indication information that the Rx instance identifier corresponding to the Gx/Gxx instance identifier exists, the Gx/Gxx instance identifier is distinguished from the Gx/Gxx instance identifier of the PCC/QoS rule formulated according to the policy decision not triggered by the traffic information (by using different identifiers or different value ranges). Therefore, the Gx/Gxx instance identifier carried in the PCC/QoS rule formulated according to the policy decision triggered by the traffic information may be determined using the Rx instance identifier according to a policy or algorithm configured by the PCRF so that the PCRF may determine, according to the same configuration, the corresponding Rx instance identifier after the PCRF receives the Gx/Gxx instance identifier reported by the PCEF/BBERF. In this way, the PCRF does not need to store a correspondence between the Rx instance identifier and the Gx/Gxx instance identifier.

In all the embodiments described above, the media component or the media sub-component that is initially provided or the media component or the media sub-component that is subsequently updated is referred to as a media component instance or a media sub-component instance. The PCC rule or the QoS rule initially provided or the PCC rule or the QoS rule subsequently updated may is referred to as a PCC rule instance or a QoS rule instance. The Rx reference number is an identifier of the media component instance identifier or the media sub-component instance, and the Gx/Gxx reference number is an identifier of the PCC/QoS rule instance.

In the embodiments described above, by merely a flow of a Gx/Gxx interface (an interaction between the PCRF and the PCEF or an interaction between the PCRF and the BBERF), the PCRF can acquire information regarding which the PCC/QoS rule instance is not executed successfully. The above method may be applied to a scenario where the formulation of the PCC/QoS rule is not triggered by the traffic information and a scenario where the formulation of the PCC/QoS rule is triggered by the traffic information.

In all the embodiments described above, after the PCRF receives a first indication message indicating that the PCC/QoS rule instance is not successfully executed (i.e., a resource allocation failure), the PCRF determines, according to the first instance identifier in the first message, the corresponding second instance identifier of the media component instance or the media sub-component instance for making the PCC/QoS rule instance. Furthermore, the PCRF sends a second indication message to the AF which is used for indicating to the AF that a traffic instance resource allocation corresponding to the media component instance or the media sub-component instance fails. The second message carries the second instance identifier.

Accordingly, if the AF subscribes to a special action indicating a resource allocation success from the PCRF, the PCRF subscribes to an event trigger for a resource allocation success from the PCEF/BBERF. After the PCC/QoS rule instance is successfully executed, the BBERF/PCEF also sends the first message to the PCRF in a similar process, where the first message indicates that the PCC/QoS rule instance is successfully executed (i.e., the resource allocation success); and the PCRF determines, according to the first instance identifier in the first message, the corresponding second instance identifier of the media component instance or the media sub-component instance for making the PCC/QoS rule instance. Furthermore, the PCRF sends the second indication message to the AF which is used for indicating to the AF that the traffic instance resource allocation success corresponding to the media component instance or the media sub-component instance. The second message carries the second instance identifier.

In summary, after the PCRF receives the first indication message indicating an execution result of the PCC/QoS rule instance (the resource allocation result), the PCRF determines, according to the first instance identifier in the first message, the corresponding second instance identification of the media component instance or the media sub-component instance for making the PCC/QoS rule instance. Furthermore, the PCRF sends the second indication message to the AF which is used for indicating to the AF the resource allocation result of the traffic instance corresponding to the media component instance or the media sub-component instance. The second message carries the second instance identifier.

It should be understood that the methods and smart devices disclosed by the embodiments of the present disclosure may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connection between the presented or discussed components may be indirect coupling or communication connection, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of the solutions in the embodiments of the present disclosure.

Moreover, various function units in the embodiments of the present disclosure may all be integrated in one second processing unit, or each unit may be used as a separate unit, or two or more units may be integrated into one unit. The integrated unit may be implemented by hardware or may be implemented by hardware plus a software function unit.

Embodiment 4

The embodiment provides a storage medium. In the embodiment, the storage medium may be configured to store program codes for executing the steps described below.

In step S1, a first message indicating a resource allocation result is received, and a corresponding second instance identifier is determined according to a first instance identifier in the first message, where the first instance identifier corresponds to a policy rule updating for executing resource allocation and the second instance identifier corresponds to a media component instance or a media sub-component instance for making the policy rule.

In S2, a second message indicating the resource allocation result is sent to an application function (AF) entity, where the second message carries the second instance identifier.

In the embodiment, the storage medium may include, but is not limited to, a USB flash disk, a read-only memory (ROM), a random access memory (RAM), a mobile hard disk, a magnetic disk, an optical disk or another medium capable of storing the program codes.

In an implementation mode, in the embodiment, a processor preforms, according to the program codes stored in the storage medium, the following step: receiving the first message indicating the resource allocation result, and determining the corresponding second instance identifier according to the first instance identifier in the first message, where the first instance identifier corresponds to a policy rule updating for executing resource allocation and the second instance identifier corresponds to a media component instance or a media sub-component instance for making the policy rule.

In an implementation mode, in the embodiment, the processor preforms, according to the program codes stored in the storage medium, the following step: sending the second message indicating the resource allocation result to the application function (AF) entity, where the second message carries the second instance identifier.

For examples in the embodiment, reference may be made to the examples described in the above embodiments and implementation modes, and the examples will not be repeated in the embodiment.

Each of the above-mentioned modules or steps of the present disclosure may be implemented by a general-purpose computing apparatus, they may be concentrated on a single computing apparatus or distributed on a network consisting of multiple computing apparatuses, and they may be implemented by program codes executable by the computing apparatuses, so that they may be stored in a storage apparatus for execution by the computing apparatuses, and in some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present disclosure are not limited to any specific combination of hardware and software.

The above are only the embodiments of the present disclosure and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

In the embodiments of the present disclosure, a first message indicating a resource allocation result is received, and a corresponding second instance identifier is determined according to a first instance identifier in the first message, where the first instance identifier corresponds to a policy rule instance for executing resource allocation and the second instance identifier corresponds to a media component instance or a media sub-component instance for making the policy rule instance; and the second message indicating the resource allocation result is sent to an application function (AF) entity, where the second message carries the second instance identifier. The present disclosure may enable the AF to accurately acquire a resource reservation result.

What is claimed is:

1. A policy control method, comprising:
receiving, by a policy and charging rules function (PCRF) entity, a first message indicating a resource allocation result, and determining, according to a first instance identifier in the first message, a corresponding second instance identifier, wherein the first instance identifier corresponds to a policy rule instance for executing resource allocation and the second instance identifier corresponds to a media component instance or a media sub-component instance for making the policy rule instance;
sending, by the PCRF entity, a second message indicating the resource allocation result to an application function (AF) entity, wherein the second message carries the second instance identifier; and
making, by the PCRF entity, one or more policy and charging control (PCC) rule instances according to the media component instance, wherein the first instance identifier corresponding to the second instance identifier is carried in the one or more PCC rule instances,
wherein making one or more PCC rule instances according to the media component instance comprises: when a plurality of PCC rule instances are made according to the media component instance, carrying the first instance identifier in each of the plurality of PCC rule instances.

2. The method of claim 1, wherein the receiving a first message indicating a resource allocation result comprises:
receiving, by the PCRF entity, the first message indicating the resource allocation result from a policy and charging enforcement function (PCEF) entity; or
receiving, by the PCRF entity, the first message indicating the resource allocation result from a bearer binding and event report function (BBERF) entity.

3. The method of claim 1, wherein before the second instance identifier is determined according to the first instance identifier in the first message, the method further comprises one of the following:
receiving, by the PCRF entity, the second instance identifier allocated by the AF entity; and
allocating, by the PCRF entity, the second instance identifier to the media component instance or the media sub-component instance.

4. The method of claim 3, wherein the receiving the second instance identifier allocated by the AF entity comprises:
receiving, by the PCRF entity, the second instance identifier allocated by the AF entity to the media component instance.

5. The method of claim 1, wherein before the first message indicating the resource allocation result is received, the method further comprises:
allocating the first instance identifier to a PCC rule instance, wherein the first instance identifier is determined according to the second instance identifier.

6. The method of claim 1, wherein a relationship between the second instance identifier and the first instance identifier satisfies one of the following:
a value of the second instance identifier is the same as a value of the first instance identifier;
the value of the second instance identifier is calculated using the value of the first instance identifier according to configuration; and
the value of the second instance identifier is obtained according to a correspondence between the first instance identifier and the second instance identifier stored by the PCRF entity.

7. The method of claim 1, wherein the first message further carries a rule identifier of the policy rule instance and the second message further carries an identifier of the media component instance or an identifier of the media sub-component instance, wherein the rule identifier is used for determining the media component instance or the media sub-component instance.

8. A policy and charging rules function (PCRF) entity, comprising:
a processor; and
a memory, communicably connected with the processor and for storing instructions executable by the processor, wherein execution of the instructions by the processor causes the processor to perform a policy control method, wherein the policy control method comprises:
receiving a first message indicating a resource allocation result, and determining, according to a first instance identifier in the first message, a corresponding second instance identifier, wherein the first instance identifier corresponds to a policy rule instance for executing resource allocation and the second instance identifier corresponds to a media component instance or a media sub-component instance for making the policy rule instance;
sending a second message indicating the resource allocation result to an application function (AF) entity, wherein the second message carries the second instance identifier; and
making, by the PCRF entity, one or more policy and charging control (PCC) rule instances according to the media component instance, wherein the first instance identifier corresponding to the second instance identifier is carried in the one or more PCC rule instances,
wherein making one or more PCC rule instances according to the media component instance comprises: when a plurality of PCC rule instances are made according to the media component instance, carrying the first instance identifier in each of the plurality of PCC rule instances.

9. The PCRF entity of claim 8, wherein the receiving a first message indicating a resource allocation result comprises:
receiving the first message indicating the resource allocation result from a policy and charging enforcement function (PCEF) entity; or
receiving the first message indicating the resource allocation result from a bearer binding and event report function (BBERF) entity.

10. The PCRF entity of claim 8, wherein before the second instance identifier is determined according to the first instance identifier in the first message, the method further comprises one of the following:
receiving the second instance identifier allocated by the AF entity; and allocating the second instance identifier to the media component instance or the media sub-component instance.

11. The PCRF entity of claim 10, wherein the receiving the second instance identifier allocated by the AF entity comprises: receiving the second instance identifier allocated by the AF entity to the media component instance.

12. The PCRF entity of claim 8, wherein before the first message indicating the resource allocation result is received, the method further comprises:
   allocating the first instance identifier to a PCC rule instance, wherein the first instance identifier is determined according to the second instance identifier.

13. The PCRF entity of claim 8, wherein a relationship between the second instance identifier and the first instance identifier satisfies one of the following:
   a value of the second instance identifier is the same as a value of the first instance identifier;
   the value of the second instance identifier is calculated using the value of the first instance identifier according to configuration; and
   the value of the second instance identifier is obtained according to a correspondence between the first instance identifier and the second instance identifier stored by the PCRF entity.

14. The PCRF entity of claim 8, wherein the first message further carries a rule identifier of the policy rule instance and the second message further carries an identifier of the media component instance or an identifier of the media sub-component instance, wherein the rule identifier is used for determining the media component instance or the media sub-component instance.

15. A policy control system, comprising a policy and charging rules function (PCRF) entity and an application function (AF) entity,
   wherein the PCRF entity is configured to:
      receive a first message indicating a resource allocation result and determine, according to a first instance identifier in the first message, a corresponding second instance identifier, wherein the first instance identifier corresponds to a policy rule instance for executing resource allocation and the second instance identifier corresponds to a media component instance or a media sub-component instance for making the policy rule instance;
      send a second message indicating the resource allocation result to the AF entity, wherein the second message carries the second instance identifier; and
      make one or more policy and charging control (PCC) rule instances according to the media component instance, wherein the first instance identifier corresponding to the second instance identifier is carried in the one or more PCC rule instances,
      wherein when a plurality of PCC rule instances are made according to the media component instance, the first instance identifier is carried in each of the plurality of PCC rule instances,
   wherein the AF entity is configured to receive the second message.

16. The policy control system of claim 15, further comprising: a policy and charging enforcement function (PCEF) entity, wherein the PCRF entity receives the first message from the PCEF entity.

17. The policy control system of claim 15, further comprising: a bearer binding and event report function (BBERF) entity, wherein the PCRF entity receives the first message from the BBERF entity.

18. The policy control system of claim 15, wherein the AF entity is further configured to allocate the second instance identifier.

* * * * *